(12) United States Patent
Hoffert et al.

(10) Patent No.: US 11,259,079 B2
(45) Date of Patent: Feb. 22, 2022

(54) APPARATUS AND METHOD FOR ALLOCATING MEDIA CONTENT SLOTS ACROSS DISPARATE MEDIA SUPPLY CHANNEL SYSTEMS

(71) Applicant: Xandr Inc., New York, NY (US)

(72) Inventors: Eric Hoffert, New York, NY (US); Brendan Greene, Denver, CO (US); Craig Miller, Louisville, CO (US)

(73) Assignee: Xandr Inc., New York, NY (US)

( * ) Notice: Subject to any disclaimer, the term of this patent is extended or adjusted under 35 U.S.C. 154(b) by 0 days.

(21) Appl. No.: 16/987,970

(22) Filed: Aug. 7, 2020

(65) Prior Publication Data

US 2021/0281907 A1    Sep. 9, 2021

Related U.S. Application Data

(60) Provisional application No. 62/987,144, filed on Mar. 9, 2020.

(51) Int. Cl.
*H04N 21/438* (2011.01)
*H04N 21/442* (2011.01)
(Continued)

(52) U.S. Cl.
CPC ......... *H04N 21/438* (2013.01); *H04N 21/442* (2013.01); *H04N 21/4627* (2013.01); *H04N 21/47202* (2013.01)

(58) Field of Classification Search
None
See application file for complete search history.

(56) References Cited

U.S. PATENT DOCUMENTS

2017/0208370 A1*  7/2017  Ray ................... G06Q 30/0264

OTHER PUBLICATIONS

Marvin, Ginny, "Addressable TV from the media buyer's perspective What's hype vs. reality", Martech: Advertising, https://martechtoday.com/addressable-tv-media-buyer-perspective-hype-reality-207086, Nov. 17, 2017, 11 pages.

(Continued)

*Primary Examiner* — Omar S Parra
(74) *Attorney, Agent, or Firm* — Guntin & Gust, PLC; Mark Wilinski

(57) ABSTRACT

Aspects of the subject disclosure may include, for example, receiving first data from each media publishing system of a plurality of media publishing systems which facilitate a presentation of media content with one or more procurable media content slots, where the first data from each media publishing system have incompatible data structures; mapping the first data from each media publishing system to second data which has a common data structure; receiving a target description from a media procurement system, the target description including information to procure media content slots provided by one or more of the plurality of media publishing systems; comparing the target description to the second data in the common data format; identifying from the comparing at least one procurable media content slot provided by one or more media publishing systems that correlates to the target description; receiving first viewership data associated with viewership of media content presentations that include the at least one procurable media content slot; generating according to the first viewership data an estimated viewership size associated with the viewership of media content presentations that include the at least one procurable media content slot; and providing, by the processing system, the estimated viewership size to the media procurement system. Other embodiments are disclosed.

23 Claims, 28 Drawing Sheets

(51) Int. Cl.
*H04N 21/4627* (2011.01)
*H04N 21/472* (2011.01)

(56) References Cited

OTHER PUBLICATIONS

Marvin, Ginny, "FAQ: Addressable TV & the convergence of digital video and TV ad buying", Martech: Advertising, https://martechtoday.com/addressable-tv-state-cross-device-ad-buying-203737, Sep. 8, 2017, 10 pages.

* cited by examiner

Buyer's summary screen with RFPs.

FIG. 3J

Additional summary page details Seller accepts the RFP ... "Submit"

APPARATUS AND METHOD FOR ALLOCATING MEDIA CONTENT SLOTS ACROSS DISPARATE MEDIA SUPPLY CHANNEL SYSTEMS

CROSS-REFERENCE TO RELATED APPLICATIONS

This application claims priority to U.S. Provisional Application No. 62/987,144, filed on Mar. 9, 2020. All sections of the foregoing patent application are incorporated herein by reference in their entirety.

FIELD OF THE DISCLOSURE

The subject disclosure relates to apparatus and method for allocating media content slot across disparate media supply channel systems.

BACKGROUND

Distribution of media content such as on-demand videos and broadcast media content is evolving from an environment that is localized to on-premises equipment (e.g., set top boxes) supplied by cable companies, satellite companies, and others to a decentralized model that delivers media content to any device, in any location, at any time. Streaming technologies have accelerated a transition to a decentralized environment that includes numerous supply channels that support the distribution of media content such as, for example, linear television (TV), data-driven linear TV, addressable TV, connected TV, over-the-top (OTT) networks, web portals, and so on. These systems are generally not interoperable with each other and thereby lead to inefficiencies as to how media content slots can be procured from such systems by other media content suppliers.

BRIEF DESCRIPTION OF THE DRAWINGS

Reference will now be made to the accompanying drawings, which are not necessarily drawn to scale, and wherein:

FIGS. 3A, 3B, 3C, 3D, 3E, 3F, 3G, 3H, 3I, 3J, 3K, 3L, 3M, 3N, 3O and 3P illustrate an example, non-limiting embodiment of a user interface for a multi-buyer, multi-seller media marketing system.

DETAILED DESCRIPTION

Figure 1:
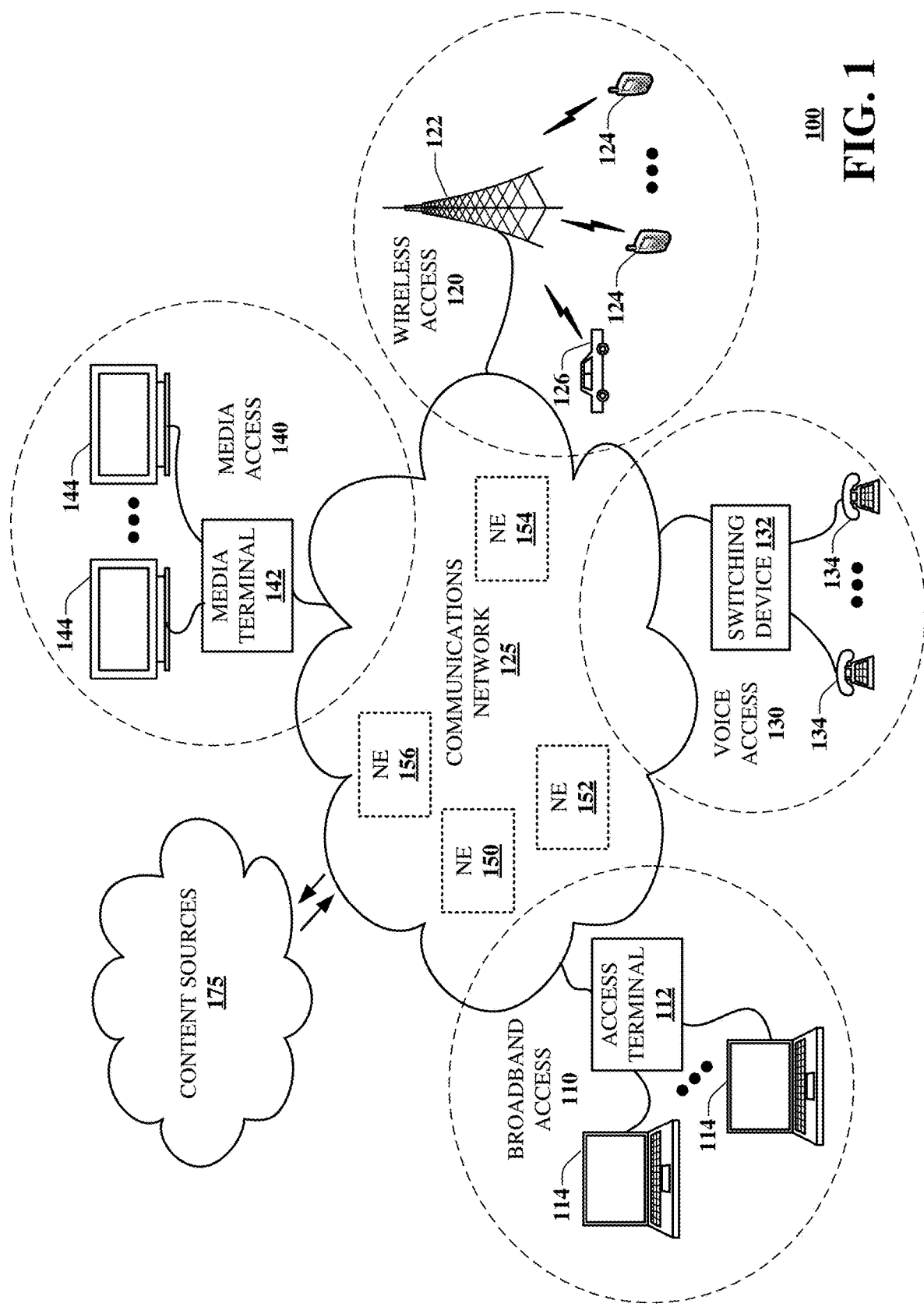
FIG. 1 is a block diagram illustrating an exemplary, non-limiting embodiment of a communications network in accordance with various aspects described herein.

The subject disclosure describes, among other things, illustrative embodiments for a multi-buyer, multi-seller media content marketplace for providing media content to content recipients over a wide variety of media content systems. Other embodiments are described in the subject disclosure.

One or more aspects of the subject disclosure include receiving, by a processing system including a processor, first data from each media publishing system of a plurality of media publishing systems, the plurality of media publishing systems facilitating a presentation of media content with one or more procurable media content slots, and the first data from each media publishing system of the plurality of media publishing systems having incompatible data structures. The subject disclosure further includes, mapping the first data from each media publishing system of the plurality of media publishing systems to second data having a common data structure. The subject disclosure further includes receiving a target description from a media procurement system, the target description including information to procure media content slots provided by one or more of the plurality of media publishing systems and comparing the target description to the second data in the common data format. The subject disclosure further includes identifying from the comparing at least one procurable media content slot provided by one or more media publishing systems of the plurality of media publishing systems that correlates to the target description and receiving first viewership data associated with viewership of media content presentations that include the at least one procurable media content slot. The subject disclosure further includes generating, according to the first viewership data, an estimated viewership size associated with the viewership of media content presentations that include the at least one procurable media content slot and providing the estimated viewership size to the media procurement system.

One or more aspects of the subject disclosure include a method, apparatus and machine-readable medium implementing a multi-buyer, multi-seller media content marketplace for identifying media content to deliver to audiences of interest and arrange for and deliver the media content. The media content may be delivered over selected media delivery networks which may be otherwise incompatible. Further implemented is collection of information about delivery of the media content to viewers and subsequent use of the collected information in the media content marketplace. The collected information may be used to provide an estimate of viewership size or audience for future delivery of the media content.

Recent advances in technology have created new and different types of media distribution, including distribution of television (TV) programming. These include data driven linear (DDL) TV, addressable TV and over the top (OTT) or connected TV. Some television distribution, and distribution of advertising to viewers, may encompass combinations of these types of television. The embodiments described herein may be readily extended to other types of television as well. Moreover, while television programming is described in many embodiments herein, the devices and techniques disclosed herein may be extended to any type of media content, including video content, audio content, still images, text, live programming, pre-recorded programming, digital programming including web pages described by Hyper Text Markup Language (HTTP) or other means, and any other types of media content to be developed. Television is a convenient exemplar because it incorporates many aspects of other types of media content.

Linear TV provides a real-time television service that broadcasts scheduled programs, conventionally over the air or through satellite or cable connections to a wide range of users able to receive the broadcast, not streamed to a specific user. Nearly all broadcast television services qualify as linear TV.

Traditional over-the-air broadcasting or traditional pay TV service may be referred to as data driven linear (DDL) television. In data driven linear, advertising inventory is sold on the basis of audience and the ability to reach an audience of interest to an advertiser. Examples of audience interests include desire to buy a car, or interest in traveling to a particular destination such as Hawaii. Data driven linear TV uses a method of finding different television programmers and dayparts in traditional national broadcast TV that index most highly to the audience an advertiser is interested in reaching. A daypart is a block of time that divides the day into segments for purchase, scheduling and delivery. Examples of dayparts include morning drivetime or primetime. Examples of current DDL networks or programmers include Warner Media, Disney, A&E, Discovery, Viacom, Fox, TBS, Univision, and others now active or active in the future. Some advertising platforms are able to aggregate inventory from two or more of these or other programmers when selling advertising.

Data-driven linear TV allows advertisers to deliver audience-based advertising via linear television. DDL is sometimes organized or considered by one or more dayparts. The dayparting method is often used with DDL programming and other programming to tailor content to specific audiences throughout the day. DDL may be considered as indexing dayparts and networks based on audiences with highest propensity for those dayparts and networks. For example, a pizza chain of restaurants could seek an audience composed of people with an application (app) associated with the pizza chain downloaded on their phones. From the app, the pizza chain can determine which networks and dayparts most strongly index with those pizza-ordering customers on linear TV. The pizza chain can then buy those dayparts from its usual linear TV suppliers but transact using a legacy demographic that suppliers are comfortable guaranteeing, such as adults 25 to 54 years old.

Addressable TV provides the ability to show different ads to different households while they are watching the same program. With the help of addressable advertising, advertisers can move beyond large-scale traditional TV ad buys to focus on relevance and impact. This may be referred to it as household targeted TV. An example of an addressable TV programmer is DirecTV. Addressable TV may be provided by networks such as cable networks using coaxial cable, digital subscriber line (DSL), fiber optic cable, satellite or other wireless systems. Each household has a unique address or unique network connection. In some installations, customer premises equipment (CPE) such as a set top box or cable box is provided for demodulation, channel selection, program recording and other functions. Addressable TV advertising provides the ability to deliver selected advertising to households that match targeted attributes desired and specified by an advertiser.

Connected TV or CTV is a type of TV that is addressable on the device level. CTV is a television or other media display device that is connected to the internet. Over-The-Top (OTT) refers to content that is being streamed through the public internet onto a laptop computer, mobile device, tablet or connected TV. CTV can stream OTT content through applications. CTV may be referred to as enabling one-on-one targeting of CTV devices. This may be achieved at the household level if a household has a single device. In many cases, a household has multiple or many devices for viewing television programming, including one or more televisions including smart TVs, portable devices such as tablets and laptop computers or mobile devices such as cellular telephones and the like. For example, each device may have its own internet protocol (IP) address or other identifier for communicating and receiving television programming. Programming may be distributed throughout the household over wireline or wireless networks according to the IP address or other unique device identifier. Technology such as internet protocol television (IPTV) over wireline or wireless networks may be used to provide one-way communication or two-way communication with an individual device.

In some applications, multiple communication technologies may be used to implement any of these types of television. Technologies for communicating television programming include fiber optic communications to a neighborhood switch, DSL over coaxial to a set top box and wireless router and WiFi, Bluetooth or other wireless technology to the end user device. Any of these technologies may be used, in any suitable combination, along with other technologies to be developed.

As noted, as television technology continues to develop, other television communication types will develop as well. Advertisers desire to reach viewers of data driven linear television programming, addressable television programming and over the top television programming. Conventionally, purchasing of TV advertising has been based on purchasing based on demographics such as age and gender of the viewing audience. In such conventional marketplaces, advertisement buying has been done among advertisers, programmers and advertising agencies using fax communications and email communications, spreadsheets and phone calls in a largely manual process among individual humans buying and selling advertising.

For advertisers interested in the three noted types of television, and future systems as well, a system and method in accordance with the subject disclosure is able to automate the buying and selling of different classes of inventory in such a way that the buyer can identify a single desired audience and then be able to reach that audience with individual sellers in individual marketplaces, across multiple sellers within individual marketplaces, or across multiple marketplaces including multiple sellers.

The system and method in accordance with some embodiments of the subject disclosure provides a digital advertising exchange or marketplace. A digital exchange for buying and selling TV advertising allows advertisers to achieve many important goals. One goal is the ability to buy or target specialized audiences as opposed to just the traditional age and gender based demographic audiences. A second goal is the ability to buy on the basis of outcomes of interest to the advertiser. Examples of such outcomes include online sales; offline sales; retail traffic such as in traffic in a store; website traffic; brand awareness; pure reach; mobile application (app) installations; and the ability to tune into a TV program. A third goal is to provide to a buyer of TV advertising information about audiences available to that buyer, to the makeup of the audiences and size of an audience that matches targeting goals of the buyer, and to provide such information before the buyer requests proposals from sellers.

Conventional TV advertising has been referred to as "spray and pray," meaning spending a large budget by an advertiser to reach viewers based on demographics. A system and method in accordance with the subject disclosure allows advertisers to target viewers having very particular interests, such as travel to Hawaii and to closely track success of the advertising. Measurement of success may be based on other trackable activity, such as booking a hotel in Hawaii by a viewer who saw a particular advertisement. Other measurements of success may be available as well, such as tracking how many times a hotel booking happened, how much sales were generated, how much it cost to run the campaign, the return on investment (ROI), and others. Moreover, a system and method in accordance with the subject disclosure allows for advertising that is much more relevant to viewers and at the same time moves away from guaranteed delivery. Conventional advertising uses age and gender guarantees, such as 20 million impressions over a set time, or men and women ages 18-35 years, and payment is based on success of the guaranteed delivery. In a system and method in accordance with the subject disclosure, one measure of success will be, for example, how many trips are booked to Hawaii in response to a displayed advertisement. The subject disclosure provides embodiments for targeting such advertising, over many types of television programming, and tracking the results of the advertising. This provides advantages to buyers of advertisements, sellers of advertising, programmers and viewers.

Referring now to FIG. 1, a block diagram is shown illustrating an example, non-limiting embodiment of a communications network 100 in accordance with various aspects described herein. For example, communications network 100 can facilitate in whole or in part a multi-buyer, multi-seller media content marketplace which receives data from media publishing systems and a target description from a media procurement system, identifies procurable media content slots corresponding to the target description and generates estimate viewership size for the procurable media content slots. The communications network 100 can operate in conjunction with a TV advertising marketplace among buyers and sellers for placement of media content among a plurality of media publishing systems including broadcast, cable, addressable, data driven liner and connected TV systems, among others. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
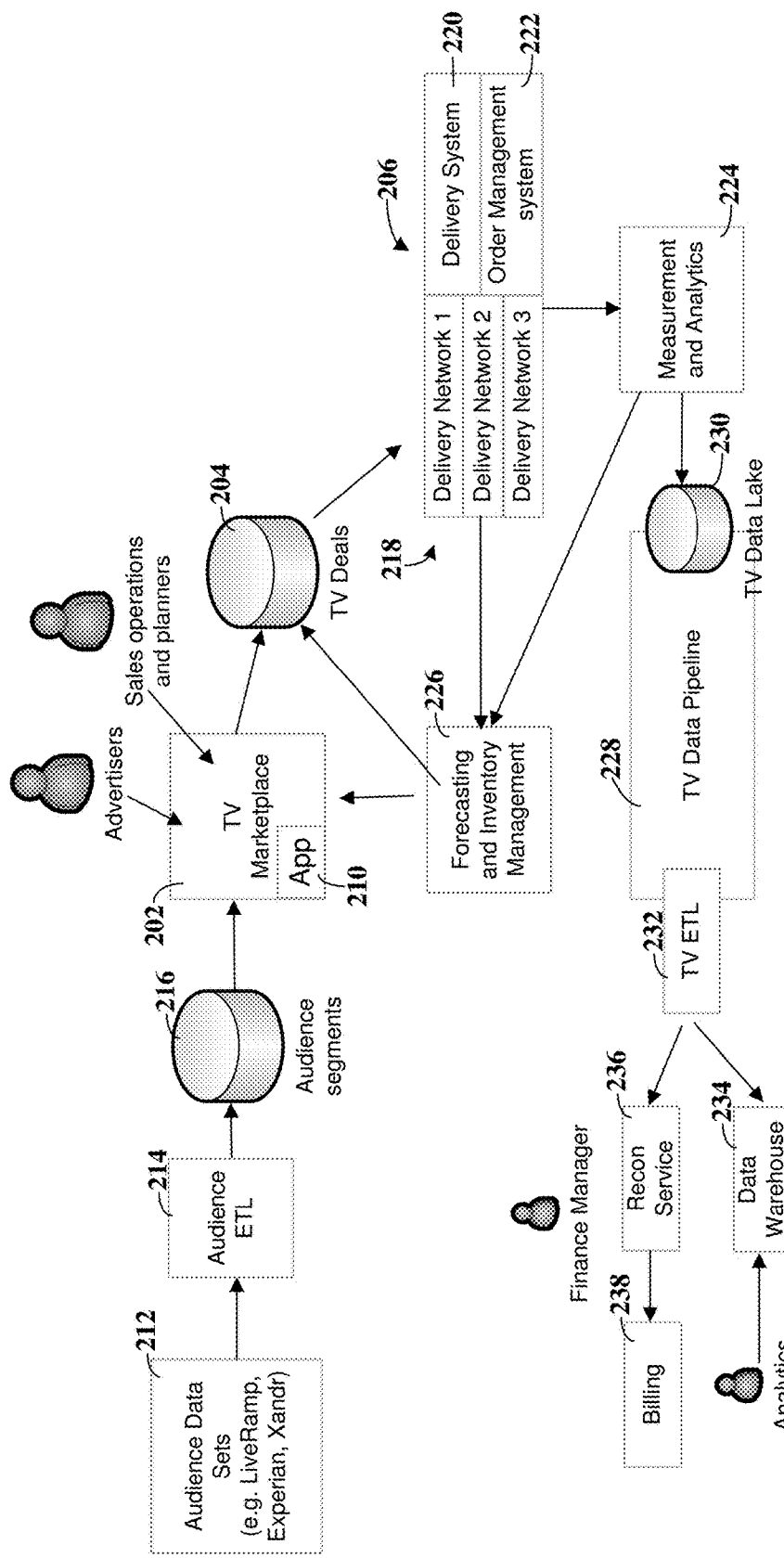
FIG. 2A is a block diagram illustrating an example, non-limiting embodiment of multi-buyer, multi-seller media marketing system operable with the communication network of FIG. 1 in accordance with various aspects described herein.

FIG. 2A is a block diagram illustrating an example, non-limiting embodiment of a media content system 200 and data flow which may function within the communication network 100 of FIG. 1 in accordance with various aspects described herein. Aspects of the embodiment of the media content system 200 particularly reflect operations in a TV marketplace. The workflow in the media content system 200 may accommodate delivering media content and advertising to linear TV systems, addressable TV systems, data driven linear (DDL) TV systems, connected TV systems, over-the-top TV systems, virtual multichannel video programming distributor (virtual MVPD) systems, digital content systems (e.g., webservers that present portals of selectable content via web pages), or other types of media content channel delivery systems, currently known or to be developed in the future (collectively, these systems may be referred to in the subject disclosure from time-to-time as supply channels). The media content system 200 can include component parts such as a TV marketplace device 202, a TV deals database 204, media content delivery channels 206, audience data sets 212, audience extract, transform and load (ETL) process 214, an audience segments database 216, a measurement and analytics system 224, a forecasting and inventory management system 226, a TV data pipeline 228, a data warehouse 234 and a billing reconciliation process 236.

The TV marketplace device 202 operates to connect media content delivery channels 206 (supply channels) with media content providers including advertisers and sales planners. The TV marketplace device 202 may be implemented by any suitable data processing system including a processor and data storage such as a memory. One suitable example of a processing system for implementing the TV marketplace device 202 is a server system with network access to internal networks and external networks including the Internet for interacting with local and remote data processing systems. Generally speaking, a processing system can be utilized by any of the component parts of the media content system 200. Such a processing system can be dynamically configured utilizing a virtual machine architecture as discussed below in relation to FIG. 4 to provide configurable processing and communication resources to address among other things changes in demand encountered by the media content system 200.

The parties interacting with the TV marketplace device 202 may be entities such as one or more advertisers or an advertising agency (collectively, advertisers), publishers or operators of content delivery networks (e.g., supply channels), or individuals (e.g., brokers) operating on behalf of such entities. The parties interacting with the TV marketplace device 202 may include buyers and sellers of advertising and other content items. Moreover, interaction with the TV marketplace device 202 may be automated and under control of one or more data processing systems and process flows associated with a respective marketplace participant. A computer system of the marketplace participant may interact with the TV marketplace device 202, either automatically and/or under user control in at least some aspects.

The advertisers have content to provide to media content viewers including television viewers. The sales planners represent buyers and advertisers and use information in the TV deals database 204 to move from planning a media content deal, such as an advertising engagement or campaign, to a completed transaction to place media content to one or more media content delivery channels 206. The TV marketplace device 202 in one aspect implements one or more state machines wherein respective states represent respective phases or steps of planning, negotiating, agreeing on and implementing an agreed transaction including executing the placement of media content such as advertising on the media content delivery channels 206.

The TV marketplace device 202 may be implemented on any suitable data processing device or arrangement of components. In some embodiments, the TV marketplace device 202 implements a TV marketplace application 210 accessible by various marketplace participants, including buyers and sellers of media content.

The TV marketplace application 210 is operative to receive from a buyer or other media procurement system a target description defining an audience to reach and other aspects of a media content presentation campaign. The target description may include information about the desired audience and where media content should be placed in media content slots. Such media content slots may be defined by a variety of characteristics and/or seller and/or buyer policies, including a network or network provider, a geographic area, composition of the desired audience or interests of the desired audience (e.g., demographics, psychographics, or other descriptive properties of an audience), one or more times during which the media content may be shown, limits such as frequency caps on how often the media content may be shown, avoidance of temporal proximity in presentations of competing media content (e.g., avoidance of two competing advertisements being presented in sequence), avoidance of biased targeting of audiences, brand safety policies for preventing presentation of an advertisement with undesirable content, policies for maintaining anonymity and privacy of audiences and individuals being targeted, and other suitable present and future characteristics and/or policies contemplated by the subject disclosure. A buyer and a seller may operate a computer, mobile device or other system, either remotely or locally, as the media procurement system. The media procurement system may exchange data with the TV marketplace device 202 over one or more networks, for example.

Figure 3A:
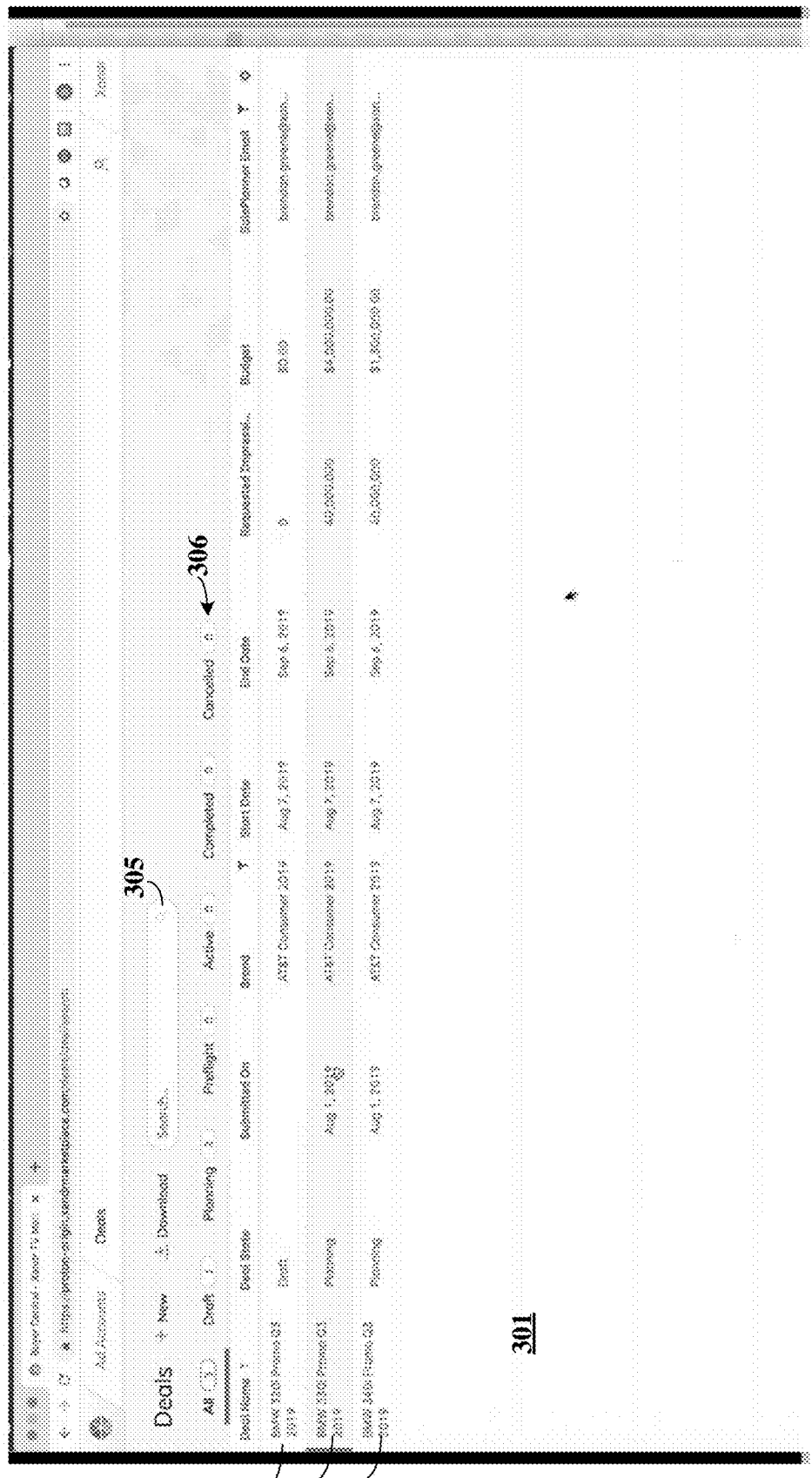

The TV marketplace device 202 in such an embodiment presents an interface to each marketplace participant. The interface may be accessible as a web page or series of web pages viewable on a device of the market participant. The interface may provide data and information about the marketplace to the participant. The interface may have facilities for receiving data and information from the participant, including text entry boxes, drop down menus, etc. FIGS. 3A through 3P illustrate one exemplary embodiment of a suitable interface that may be accessed by buyers and sellers to interact with the TV marketplace device 202.

Each interface may be unique to each participant. For example, a person or entity participating in the market of media content system 200 may interact with an interface tailored to the role of that individual. In one example, a buyer of media content will see and interact with an interface with features suitable for activities of a buyer of media content. Similarly, a seller of media content will see and interact with an interface having features suitable for activities of a seller of media content. Also, an interface for a particular participant in the TV marketplace application 210 of the TV marketplace device 202 may be tailored to that particular participant, so that, for example, if the participant only interacts with a subset of other participants, the interface seen by that participant will only include information for and from that subset of participants. A seller who only sells to a group of buyers will see information only about those buyers, not all buyers in the marketplace.

Further, data and information of the deals database 204 may be shared on an exclusive basis among market participants. For example, a buyer may prepare a request for proposal (RFP) and specify a subset of sellers who should see and may respond to the RFP. The RFP may include a target description which includes information to procure media content slots provided by media publishing systems such as one or more of the delivery networks 218. Information about the RFP will be stored in the deals database 204. By operation of the TV marketplace device 202, information about the RFP will be provided from the deals database 204 to respective interfaces associated with each respective seller of the subset of sellers. The respective sellers may respond to the RFP on an individual basis and provide respective proposals in return, using their respective interfaces, and information about the respective proposals is stored in the deals database 204 for access and interaction by the buyer who initiated the RFP.

The TV marketplace application 210 provided by the TV marketplace device 202 in some embodiments provides a variety of information to market participants. Such information may include information about booked orders, forecasted impressions before a campaign begins, delivered impressions once a campaign begins executing, measurements based on delivered impressions, validation or attribution as to the success of such delivered impressions, or any combinations thereof. This permits mid-campaign stewardship reporting where market participants have the ability to see campaign progress including verified impression counts coming from a third-party source (e.g., Nielsen™, Comscore™, DoubleVerify™, etc.).

Further, the TV marketplace application 210 may provide to a buyer detailed information about audiences available to the buyer, including audiences matching targeting requirements of the buyer such as defined segments or audience demographics or location. It will be further appreciated that media content system 200 and its component parts is configured to suppress and prevent a viewing by buyers and/or sellers of sensitive information of individual consumers and/or groups of consumers to maintain privacy and anonymity of any targeted audience.

Generally, it will be appreciated that the subject disclosure contemplates that all systems, flowcharts, software and/or hardware or other related techniques depicted in the figures of the subject disclosure or otherwise described by the subject disclosure can be configured to safeguard the privacy and anonymity of any targeted audiences or individual. For example, any form of consumer data in any format obtained according to such systems, flowcharts, software and/or hardware or other related techniques described or depicted in the figures of the subject disclosure can be configured to reformat consumer data so as to abstract such data before presentation to sellers and/or buyers by utilizing, for instance, anonymous tokenized identifiers to prevent disclosure of private consumer data to sellers and/or buyers.

The abstraction techniques described in U.S. patent application, Ser. No. 16/663,453, filed Oct. 25, 2019, by Jakka et al., entitled "System and Method for Securing Identity Identifiers for Data Engineering Processing", filed herewith as Attachment A, can be utilized to modify and/or configure any systems, flowcharts, software and/or hardware or other related techniques depicted in the figures of the subject disclosure or otherwise described by the subject disclosure to safeguard privacy and anonymity of any targeted audience including individuals or groups of individuals. All sections of U.S. patent application, Ser. No. 16/663,453 are incorporated herein by reference in their entirety. It will be appreciated that one or more embodiments of the foregoing patent application can be combined in whole or in part with one or more embodiments of the subject disclosure to achieve anonymity of consumer data.

It will also be appreciated that other anonymization techniques not described by the subject disclosure or the aforementioned patent application that can be applied to embodiments described by the subject disclosure to enable safeguarding privacy and anonymity of targeted audiences are also contemplated by the subject disclosure. Although anonymization of consumer data may not in all instances be referred to in other parts of the subject disclosure, the aforementioned anonymization techniques can be applied to safeguard privacy and anonymity of consumers at stages of a marketplace transaction that are exposed to sellers, buyers, or other non-authorized third parties.

Referring back to FIG. 2A, the TV marketplace application 210 accordingly receives from media publishing systems including the delivery networks 218 data about presentation and consumption of media content, including impressions or verified impressions. In some embodiments, the received data is received from the various media publishing systems in disparate incompatible formats. Each media publishing system uses proprietary or preferred data formats and data structures which cannot be readily processed together. To resolve this limitation in prior art supply channels, the TV marketplace can be configured to receive audience segment data from third party sources (e.g., Nielsen™, Comscore™, DoubleVerify™, etc.), and/or derive audience segment data from raw data provided by supply channels such as addressable TV networks, connected TV networks, OTT networks, wireless mobile communication networks (e.g., WiFi access points, cellular access points), ad server exchanges, and so on. The TV marketplace application 210 can map the aforementioned data from the incompatible formats to a common data structure or data format or universal data format. The TV marketplace application 210 can be configured, for example, to identify which data types provided by one supply channel is common to another supply channel and for example remap both data types into a common data structure.

The TV marketplace application 210 can also be configured to utilize identity graphs to bind across disparate supply channels and thereby achieve a common identity definition by using a graph of definitions that identify an audience. Identity graphs can be accomplished by way of a database that creates linkages between audience identifiers supplied by differing supply channels. The audience identifiers can be associated with an individual consumer or grouping of consumers and are linked via the database to identify an audience segment that can be presented to sellers and/or buyers in a manner that is agnostic to the supply channels that formed the audience segment. A common data structure having a taxonomy that binds definitions across supply channels provides a unique opportunity for buyers to seek an audience segment irrespective of the supply channels that make up the audience segment.

Presenting buyers one or more audience segments that are supply channel agnostic provides an opportunity for buyers to improve the distribution of spend of their campaigns (e.g., higher volume of consumers targeted without increasing cost) and at the same time improve the yield of inventory consumption for sellers. For example, presenting buyers an audience segment that is supply channel agnostic can compel a buyer to distribute his/her campaign to more than one supply channel and target prime and non-prime procurable media content slots singly or in combination, to improve the distribution of spend by buyer. This in turn can help sellers improve yield of undersold inventory (e.g., inventory in non-prime procurable media content slots). The foregoing technique is in stark contrast to prior art systems in which supply channels generally operate in silos. Buyers who focus on a single supply channel are often compelled to spend significantly on prime time procurable media content slots or other slots that may not effectively reach an audience of interest to the buyer. The TV marketplace application 210 solves this limitation by presenting buyers an audience segment supplied by a combination of supply channels rather than a single supply channel, which is advantageous to both buyers and sellers. The universal data format described above may be suitable for use within the TV marketplace application 210 and for sharing data with and communicating with the marketplace participants including buyers and sellers.

To provide to the buyer the detailed information about available audiences, the TV marketplace application 210 may receive a target description defining one or more audiences of interest to the buyer and compare the target description to data defining available impressions or audiences across supply channels. Based on the comparison, the TV marketplace application 210 may identify at least one procurable media content slot provided by one or more delivery networks or other media publishing systems (e.g., supply channels) and obtain first viewership data associated with viewership of media content presentations that include the at least one procurable media content slot. The at least one procurable media content slot may be defined by an associated delivery network or date and time or daypart or by any other suitable information.

To assist the buyer in deciding on a media buy or where to place a media buy when preparing a Request for Proposal (RFP), the TV marketplace application 210 may generate an estimated viewership size associated with the at least one procurable media content slot and provide the estimated viewership size to the buyer or the buyer's media procurement system. With this, the buyer has access to information about available audiences on a wide variety of media publishing systems (supply channels), including various TV types, for audiences defined by the buyer according to his/her targeting interests. The targeting interests may be tailored to each of the various TV types, for example, and measured data and audience estimates may be transformed into a common presentation to simplify the buying process.

In some embodiments, the TV marketplace application 210 may run as a managed service. In other embodiments, the TV marketplace application 210 may be implemented as a self-service arrangement accessible by the participants. The TV marketplace application 210 may be implemented in other devices and in accordance with other design goals.

The deals that are the subject of the information stored in the deals database 204 are based on a variety of different types of data that can be layered on for audience-based buying of television. Television advertising has conventionally been based on demographics, such as age and gender of an audience, and referred to as in-demo buying. Audience based buying across multiple supply channels allows buying advertising based on specialized audiences, focused on particular interests, psychographic data about consumers, activities or other aspects of individuals forming an audience enabling buyers to buy from multiple supply channels without the buyers being limited to choose an audience segment from a single supply channel. Such interests can include for example, interest in travel, or interest in biking to work, or interest in listening to streaming music.

Audience interests are reflected in information contained in the audience data sets 212. The audience data sets 212 represent available audiences for audience-based buying of television. The audience data sets 212 may be collected from a variety of sources and information about individuals who view media content across supply channels including television programming, streaming content, on-demand content, web browsing, or otherwise, and whose activities may be detected. In some embodiments, there are generally three types of data sets that may be collected in the audience data sets 212. The first type is proprietary data based first-party interaction. The second type is data such as first-party lists, referred to as Bring Your Own Data or BYOD. The third type is third-party audience data supplied by Nielsen™, Comscore™, DoubleVerify™, etc.

One example audience data set is information about subscribers to television services that employ a media terminal 142 such as a set top box (FIG. 1). If a return connection from the media terminal 142 is provided, the media content provider can detect a wide variety of activities and interests about viewers who engage with the television service. This information can be used to determine individual attributes and traits of the viewers. Attributes may include information such as "watched a movie about surfing," and "searched for travel programming about Hawaii." Traits may include, "interested in travel to Hawaii." Traits and attributes may be combined, for example using Boolean operators, to identify and define audience segments and define targeting expressions for such audience segments.

Other examples of audience data sets 212 include data received from third parties which represent personally identifiable information (PII). The data may originate with online activities of individuals or customer relationship management data or other sources, and generally has PII associated therewith. The data may be converted by a service to anonymous information that may be targeted for media content delivery, but which excludes personal information such as email addresses, telephone numbers, internet protocol (IP) addresses, and so forth. Examples of data conversion or anonymization services include Experian™ Information Solutions, Inc., and LiveRamp™ Holdings, Inc. In some embodiments, these data sets may be referred to as Bring Your Own Data (BYOD).

Another example of audience data sets 212 is data sourced from third-party data collection and aggregation sources. One example of such an audience is referred to as Nielsen™ advanced targets provided by the Nielsen™ Company. Nielsen™ advanced targets are commonly used for addressable television. The data may include information with a defined buyer target, such as new mothers or avid hikers, typically with underlying age or gender categorization. Other third-party sources may provide information to the audience data sets 212 as well.

Information from the audience data sets 212 may be provided to the audience extract, transform and load (ETL) process 214. The audience ETL process 214 receives audience data set information in various formats and reformats the data into a plurality of audience segments. Following the ETL process 214, audience information may be stored in the audience segments database 216 as audience segment data. As audience segments, the audience information produced by the audience ETL process 214 may be used in one or more TV deals or other media content delivery deals where someone has created a TV deal that encompasses particular goals for content delivery, budget and other parameters. Further, the audience segments and other audience information may be used to provide to a buyer an estimate of available audiences and corresponding audience sizes (reach) across different supply channels of each type, e.g., addressable TV, DDL TV and connected TV, and aggregate audiences across combinations of networks. The deal that is created in the TV marketplace device 202 may involve providing media content including television advertising to viewers across the disparate media content delivery channels 206 (supply channels).

The information about audience data sets and available audience segments in the audience segments database 216 may be used generate an estimate (or forecast) of a targeted audience. The TV marketplace application 210 may provide to a buyer an estimate of audience size for a targeted segment for all sellers (across supply channels) with which the buyer may place a TV buy. This audience estimate may be provided across supply channels, e.g., addressable TV, data driven linear TV and connected TV networks, in advance of placement of the ad buy, for narrowly defined audience segments. The TV marketplace application 210 may also calculate for the buyer a reach, meaning the size of the de-duplicated audience that can be reached, that meets the Boolean targeting audience segment expression, before completing the buy. This is a uniquely valuable advantage for the buyer.

For different types of media content provisioning, such as addressable TV, data driven linear TV and connected TV, audience estimation and measurement is done differently. For example, addressable TV conventionally uses impression-based audience measurement by a third party, such as Comscore™, Inc. The impressions are watched by households on set top boxes, for example. Data driven linear TV conventionally uses a panel of viewers in which a representative audience has measurement devices. Panel-based data is used to estimate the size of audiences but with a high degree of extrapolation. In connected TV, audience measurement is impression-based but at the device level.

The TV marketplace application 210 and the TV marketplace device 202 in some embodiments have access to measurements derived from all or some types of supply channels as well as others to be developed. The measurement information from all or some types of supply channels may be collected and used by the TV marketplace application 210 to provide a buyer estimates of available audience segments for each supply channel type or audience segments distributed across combinations of supply channel types, for each network or service provider. Such audience segment estimates can be provided to the buyer before the buyer prepares an RFP. Similarly, the measurement information for all or some types of supply channels or other network types may be subsequently collected and used by the TV marketplace application 210 for providing verification of delivery of impressions during and after the campaign. As part of the verification process, the TV marketplace application 210 can be configured to determine a percent of pixels of the impression viewed. A 100% viewing of the pixels provides a full verification of delivery to the consumer(s).

In addition, the TV marketplace application 210 can be configured to determine the consumers actions that led to a desired outcome responsive to viewing an impression at one or more supply channels—ad attribution. For example, consumer actions can be attributed to an impression (e.g., an advertisement for an automobile) delivered at an addressable TV network by determining from consumer action data obtained from the addressable TV network, another supply channel, or other suitable system whether the consumer's action correlates to the impression. For instance, the TV marketplace application 210 can be configured to obtain from a system activity data (e.g., GPS data) associated with a consumer that viewed an impression via an addressable TV network. The TV marketplace application 210 can then compare a context of the activity data to the impression delivered to the consumer to determine if the consumer's action can be attributed to the impression. Such attribution can be performed in an opt-in or opt-out program where consumers can be given an opportunity to expressly agree to sharing activity data with one or more systems including the TV marketplace application 210.

Historical verification and attribution measurements can be used by the TV marketplace application 210 to estimate available audience segments for each supply channel type or audience segments distributed across combinations of supply channel types, for each network or service provider, which it can then present the buyer via a user interface. The buyer can selectively choose one or more audience segments from one or more corresponding supply channels via the user interface to finalize an RFP. Once the buyer finalizes the RFP, the TV marketplace application 210 can be configured to present corresponding parts of (or all of) the RFP to one or more sellers of corresponding supply channels that were identified by the buyer (or supply channels that were automatically identified by the TV marketplace application 210 to optimize the buyers viewership reach). The TV marketplace application 210 can also be configured to provide inventory yield estimates (forecasting) based on procurement constraints associated with the RFP (e.g., target audience description, volume of impressions, campaign spend, frequency capping requirements, restrictions to avoid placement of competing impressions, and so on). The TV marketplace application 210 can be further configured to provide sellers yield forecasts based on displacement techniques applied to impression inventory (i.e., procurable media content slots) in accordance with U.S. patent application, Ser. No. 16/514,594, filed Jul. 17, 2019, by Miller et al., entitled "Method and Apparatus for Managing Allocations of Media Content in Electronic Segments", filed herewith as Attachment B, all sections of which are incorporated herein by reference in their entirety.

For example, suppose the present buyer's RFP targets at least a portion of impression inventory across one or more supply channels that has already been allocated (i.e., sold) by prior impression sales associated with other RFPs of other buyers accepted by the one or more sellers, thereby preventing the one or more sellers from fulfilling an inventory sale that fulfills the inventory volume requested by the current buyer. Conflicts such as this that reduce the availability of impression inventory can occur when the target audience description included in the RFP of the present buyer overlaps in whole or in part with the audience segment of previously allocated inventory (e.g., prior RFP target males over 45 years of age and the present RFP targets males over 45 with a certain income level). With the displacement techniques described by U.S. patent application, Ser. No. 16/514,594, the TV marketplace application 210 can be configured to identify unallocated inventory (i.e., unsold inventory) that matches the target audience of the previously allocated inventory (e.g., males over 45) and relocate (i.e., displace) such prior sales to the unallocated inventory, thereby making room for the sale of inventory targeted by the present buyer (e.g., males over 45 with a certain income level). Displacement thus enables sellers to increase their yield and enables buyers to pursue more inventory.

Accordingly, when one or more sellers are presented a buyer's RFP via the TV marketplace application 210, the TV marketplace application 210 can also provide the one or more sellers a forecast on yield utilizing the displacement techniques described above when there is insufficient inventory to satisfy the RFP. The TV marketplace application 210 can also provide the one or more sellers a forecast on yield without displacement to compare forecast models. The forecasts on yield provide the one or more sellers options as to whether to fulfill the RFP (with displacement, if required) or avoid displacement and resort to amending the RFP and thereby present the buyer via the TV marketplace application 210 one or more counterproposals that are more suitable to the one or more sellers' objectives. In the latter use case where the RFP is amended, the TV marketplace application 210 can be configured to facilitate a negotiation phase in which each of the one or more sellers and the buyer can repeat the above process until a final RFP is agreed between the parties to effectuate a sale.

It will be appreciated that the displacement technique described by the subject disclosure is a multidimensional technique that factors in, among other things, time constraints for placement of impressions, the degree of audience segment overlap between allocated inventory and inventory targeted by a buyer, sale constraints set by the buyer such as frequency capping and avoidance of placement of competitive impressions, differences in delivery logistics between supply channels, and so on. It will be further appreciated that the displacement technique described by the subject disclosure can be applied in non-real-time applications (e.g., during a yield forecast) or in a real-time market exchange that analyzes and selects a winning bid for the sale of inventory that targets an audience segment across disparate supply channels. It will also be appreciated that one or more embodiments described by U.S. patent application, Ser. No. 16/514,594 can be combined in whole or in part with one or more embodiments of the subject disclosure to improve yield optimization for sellers and distribution of campaign spend for buyers. It will be further appreciated that other displacement techniques not described by the subject disclosure or the aforementioned patent application that can be applied to embodiments described by the subject disclosure to improve optimization of yield for sellers and more effective distribution of inventory targeting by buyers.

Referring back to FIG. 2A, after a deal is concluded between a buyer and a seller in the TV marketplace application 210, the TV marketplace application 210 may begin providing media content including advertising to viewers of media content across one or more supply channels. In some embodiments, this is done by one or more insertion orders. An insertion order is a purchase order issued between a seller of advertising and a buyer such as an advertiser or advertising agency. The insertion order generally specifies details of the deal, including the line item which is the subject of the deal. Such details may include a member order identifier which identifies buyer and seller of the line item, a member order line identifier, starting and end dates for a campaign, impressions to be served, pricing and total budget. The insertion orders are trafficked to or provided to media content delivery channels 206.

The media content delivery channels 206 include one or more delivery networks 218, a delivery system 220 and an order management system 222. The delivery networks 218 may include broadcast networks, cable television (CATV) networks, internet protocol television (IPTV) networks, satellite broadcast networks including direct broadcast satellite networks, internet service and other services, both currently existing and to be developed in the future. The delivery networks 218 may communicate data and other information in any suitable format and may use wireline technology such as fiber optic, coaxial cable and others, as well as wireless technology such as satellite, microwave, cellular, WiFi and others, as well as combinations of these. The delivery networks 218 deliver media content to subscribers, including as broadcast to a wide variety of supply channels, such as linear TV, to individual households, such addressable TV and to individual devices, such as connected TV, and so on.

The delivery system 220 links the TV marketplace device 202 with the delivery networks 218. A deal in the marketplace, having data stored in the deals database 204 may specify one or more networks among the delivery networks 218 for delivery of media content such as TV advertising. The delivery system 220 responds to the definition or specifying data of the deal by distributing the media content among the delivery networks 218 according to the terms of the deal. The delivery system 220 may provide media content to one or more supply channels such as linear TV networks, addressable TV networks, connected TV systems, over the top subscribers and others including internet subscribers. Examples of suitable delivery systems are provided by INVIDI™ Technologies Corporation and Visible World™.

The measurement and analytics system 224 operates to verify impressions delivered by the delivery networks 218. The measurement and analytics system 224 receives information about media content placement from the media content delivery channels 206. In one embodiment, one or more of the delivery networks 218 may include addressable TV networks which permit targeting of media content to subscribers' homes. Such targeting enables audience-based advertising campaigns to be delivered across the marketplace. Attributes of the homes or households are known from the audience data sets 212. Advertising and other media content corresponding to targeted audience segments, stored in the audience segments database 216, may be delivered to the households. The measurement and analytics system 224 receives information about delivery of impressions and may operate to verify the impression delivery to provide a third-party confirmation of performance under the current deal. In some embodiments, the measurement and analytics system 224 may be provided by a service such as that provided by Comscore™, Inc.

Information including information about impressions is also provided by the delivery networks 218 to the forecasting and inventory management system 226. In some embodiments, the forecasting and inventory management system 226 can prepare a forecast of consumption and capacity by performing a simulation using available data. Such a simulation may use information such as historical consumption, seasonality, adjustments according to non-seasonal, one-time events. In other embodiments, in place of or in addition to simulation, a forecast may be developed by applying machine learning techniques, artificial intelligence techniques or a combination of these, to available data.

In one embodiment, the forecasting and inventory management system 226 receives impressions for analysis. Such analysis may include capacity analysis and determining future potential inventory availability for addressable TV impressions based on factors like seasonality and consumption. In some embodiments the forecasting and inventory management system 226 forms a verification system to track viewership of targeted media content including advertising when presented by one or more of the delivery networks 218. In some embodiments, the forecasting and inventory management system 226 may form a monitoring system that tracks consumption of targeted media content.

In other embodiments, the forecasting and inventory management system 226 may account for frequency capping requirements on advertisement delivery. Frequency capping refers to restricting, or capping, the number of times a viewer or audience of viewers is shown a particular advertisement. Such requirements may be specified as an instruction to limit presentation of target media content according to a threshold capacity, such as number of times per day or week. In one or more embodiments, such requirements may be specified as an instruction to avoid presentation of target media content that is related to target media content of interest in temporal proximity to each other. Such requirements may be specified, for example, by the buyer when the buyer prepares the request for proposal which is later accepted by one or more sellers. For example, if a campaign targets one million households with a campaign duration of one month, and delivery to be capped to three times per week, the forecast of available audience will be different from the ability to deliver the same ad at every open spot. In these embodiments, the forecast prepared by the forecasting and inventory management system 226 accommodates the frequency capping parameters specified for the campaign. The forecast may be used by the TV marketplace application 210 in some embodiments to prepare an estimate of available audience, including respective available audiences for each type of supply channel, e.g., addressable TV, data driven linear TV and connected TV, and for each respective delivery network.

The TV data pipeline 228 includes a TV data lake 230 and a TV extract, transform and load (ETL) process 232. Impression counts and other information from the measurement and analytics system 224 are provided to the TV data pipeline 228 and stored in the TV data lake 230. Also, information about contracted impressions that are the subject of deals in the deals database 204 may also be received and stored in the TV data lake 230. The TV data lake 230 in some embodiments includes a database for storing received data for further subsequent processing. Also, in some embodiments, the TV marketplace application 210 implemented by the TV marketplace device 202 may query the TV data lake. The TV ETL process 232 transforms the information in the TV data pipeline 228 into data for further processing and analysis.

Data from the TV ETL process 232 may be stored in the data warehouse 234. The stored data may be used for development and review of analytics by a business analytics team relating to sums spent on the TV marketplace application 210. This may include information about the deals, estimated delivery, finalized delivery counts and other information.

Data from TV ETL process 232 may also be provided to a billing reconciliation process 236. The billing reconciliation process 236 may be used by a finance management operation to review, for example, daily and month impression data. The impression data may be reconciled to develop a billing data feed 238. The billing data feed 238 may be used to provide invoices to clients for the service of delivering media content.

A system, method and machine readable medium in accordance with the subject disclosure (generally, the system) provides a number of benefits. As noted, the system makes available to a buyer detailed information about available audiences including audiences on different types of TV networks including addressable TV, DDL TV, and connected TV. Identifying available media content slots may result in an increase in utilization of previously unused procurable media content slots, since a buyer has information about networks and audiences the buyer may not have been previously aware of. Increase in utilization of previously unused procurable media slots can result in an increase in a volume of distribution of target media content including advertising and media. Other features can be utilized (in addition to or in place of features described herein with respect to the various embodiments) to enhance or otherwise facilitate the processes described herein for the buying and selling of electronic advertising, such as enforcement of various ad insertion policies and rules as described in U.S. application Ser. No. 16/560,666 filed Sep. 4, 2019, by Shivapurkar, et al., and entitled "Content Management In Over-The-Top Services," and filed herewith as Attachment D, as well as various types of deals including brokered deals such as described in U.S. application Ser. No. 16/717,243 filed Dec. 17, 2019, by Sridhar, et al., and entitled "Method And Apparatus For Managing Broker Curated Deals In Electronic Advertising," filed herewith as Attachment C, the disclosures of which are hereby incorporated herein by reference in their entirety The media content system 200 of FIG. 2A facilitates, among other things, enabling a buyer's audience definition to be discoverable across any supply channel, optimization of inventory yield for sellers, and effective distribution of spend for buyer campaigns. The media content system 200 is also configured to address consumer movement between old and new supply channels by facilitating on-boarding of new supply channels by mapping to a common taxonomy that aggregates audience segments across supply channels. Contemporaneous to supporting new supply channels, the media content system 200 provides buyers access to inventory from a spectrum of supply channels ranging from those decreasing in consumer demand to those with rapid consumption growth.

Figure 2B:
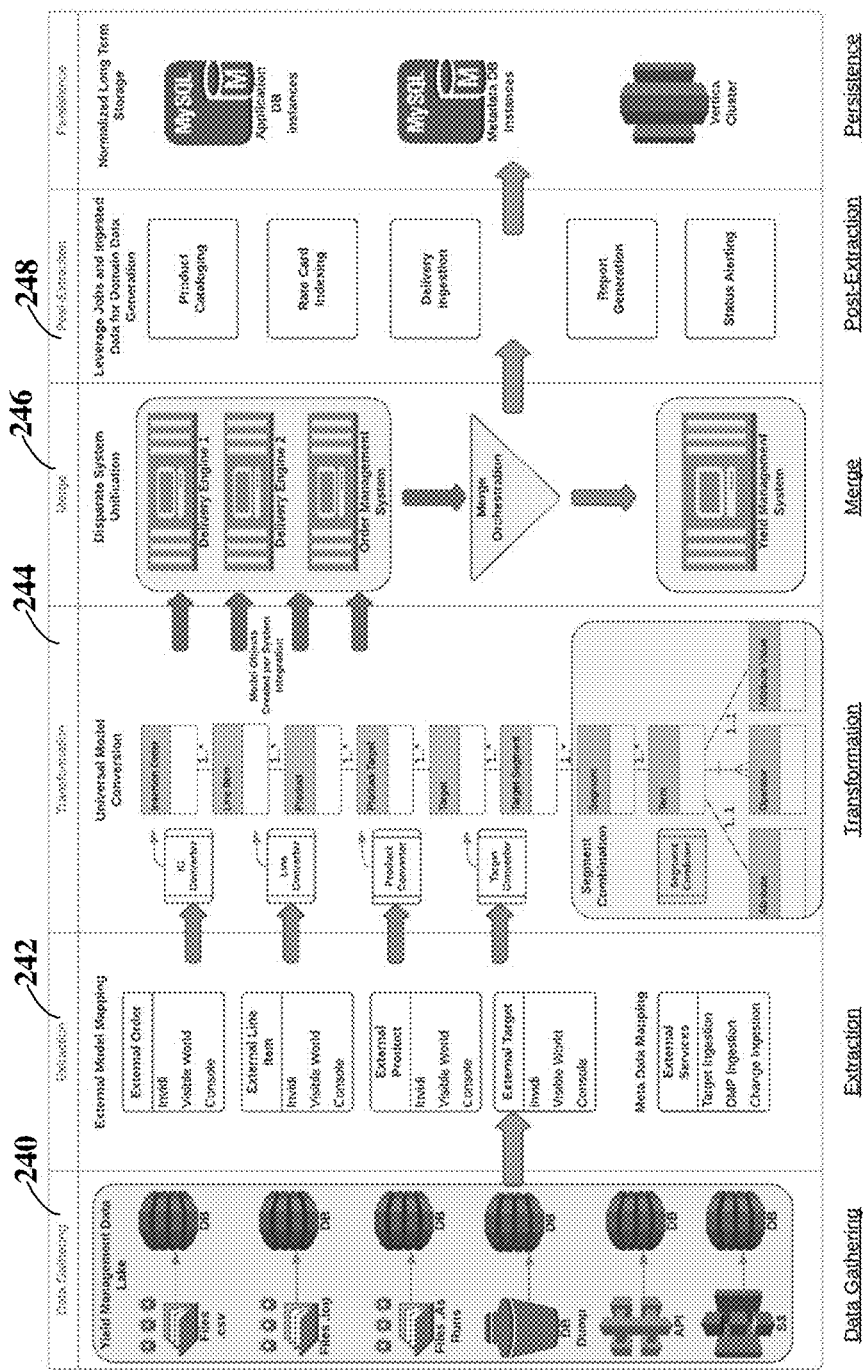
FIG. 2B depicts an illustrative, non-limiting, embodiment of a yield management TV order import flow operable with the system of FIG. 2A, in accordance with various aspects described herein.

FIG. 2B depicts an illustrative, non-limiting, embodiment of a yield management TV order import flow 208 operable with the system of FIG. 2A, in accordance with various aspects described herein. The TV order import flow 208 includes a data gathering process 240, a data extraction process 242, a data transformation process 244, a data merge process 246 and a post-extraction process 248.

In various aspects, the yield management TV order import flow 208 operates to map first data received from media publishing system such as the delivery networks 218 (FIG. 2A) to second data having a common data structure. Mapping to a common data structure improves processing of market and audience information by the TV marketplace application 210. For example, after the disparate data received from the media publishing systems have been mapped to data with a common data structure, the data may be readily combined, compared and used for processes such as forecasting and verification with in the marketplace. If only the disparate data are available, such processes may not be available or available only in a limited form.

After a deal is consummated between a buyer and seller in the TV marketplace device 202 (FIG. 2A), the deal is run through its cycle in the marketplace. That is, in typical embodiments, advertisements are placed among the delivery networks 218 and provided to end users. Results of the ad placements, including impressions, are collected by the measurement and analytics system 224, and the resulting order and delivery data is returned to the forecasting and inventory management system 226 and the TV marketplace device 202. Order data includes information about the information entered by media content delivery channels 206 (FIG. 2A) into a trafficking system or an order management system. Delivery data indicative of number of impressions delivered and other information may be processed and displayed and otherwise used for current evaluation of a campaign and for future planning.

The order data and the delivery data are received in a variety of data formats that must be normalized for further processing. As illustrated in the exemplary data flow embodiment, the order data and delivery data may be received, for example, by the data gathering process 240, as one or more .csv files and .log files for actions that were taken against a delivery engine, .as runs, database dumps, direct application programming interface (API) integrations and other types of data and files. Generally, received data in a particular format is stored in one or more data stores such as a database for further processing. These processes, for example, may done by a customer or associate actively forwarding data, in whatever format, to the data gathering process 240. In other examples, the data gathering process may actively retrieve data on a regular or periodic basis, such as nightly, from the data sources. The result may be termed a data lake and contents of the data lake are focused around order data and not just delivery data.

The data extraction process 242 in some embodiments is done by a solutions consulting enablement team which learns details of a client's business as well as technologies used by the client. The data extraction process 242 operates to map objects in external client systems into objects in internal systems. As indicated, the object received by the data gathering process 240 may be of many disparate types and formats, some possibly unique to a client. For reliable processing, comparison and further use, the disparate data types and formats must be made uniform or normalized. Thus, the data extraction process 242 operates to map order data to an internal order format. The received order data may be, for example, in formats used by services such as those provided by INVIDI, Visible World and Console. Examples of order data and delivery data that are received and process by the data extraction process 242 include external order data, external line item data, external product data and external target data received from clients.

After the data extraction process 242 has operated to map the order data and delivery data from client formats to an internal universal format, the data transformation process 244 operates to transform order data and delivery data from client format to a format consistent with an internal universal model. In the illustrated example, an insertion order conversion process receives data defining a client's external insertion order and converts it to an internal insertion order format. A line conversion process receives a client's external line item and converts it to an internal line item format. A product conversion process receives a client's external product definition and converts it to an internal product definition format.

Further, the data transformation process 244 provides for taking disparate targeting expressions and data models and converting them to a common framework. Generally, every market participant has a unique way of representing audience targeting. Rather than having a different targeting expression technology in the TV marketplace application 210 for each client's targeting representation, the data transformation process 244 converts the client's targeting representation into a universal view for the TV marketplace application 210. A target conversion process receives a client's external targeting definition and converts it to one or more internal target segments related to the client's targeting characteristics. A segment combination process receives the targeting characteristics of the client and combines them to a canonical targeting lexicon for internal processing.

The data merge process 246 operates to normalize and merge data for respective line items. The data merge process 246 takes the disparate data provided by the data transformation process 244 and merges the data into a single, unified view of an object for internal processing. The combined information can then be used by the post-extraction process 248 for various internal purposes. The post-extraction process 248 can include in some embodiments a product cataloging process, a rate card indexing process, a delivery ingestion process, a report generation process and a status alerting process. Output data from the post-extraction process 248 may be stored in persistent storage for further access and processing. In particular, the post-extraction process 248 provides the data to the TV marketplace device 202 (FIG. 2A) and TV marketplace application 210. The extracted line item data includes a member order identifier which identifies buyer and seller of the line item and a member order line identifier. Those may be used to tie an actual impression reported by the measurement and analytics system 224 back to the actual line item in the TV marketplace application 210. The TV marketplace application 210 allows users to access the line item data and see how the line item is performing during its flight.

The data originates in user interactions in the TV marketplace application 210. The marketplace operates to be an abstraction over a variety of disparate systems including the different delivery networks. That is, the TV marketplace application 210 gives a unified view into the disparate systems. The external systems represent complexity that must be accounted for when bringing back to the TV marketplace application 210 the external systems' view of the data into the marketplace system where it actually originated. The yield management TV order import flow 208 manages that complexity and conversion to universal internal data formats.

The TV marketplace application 210 in some embodiments implements a universal inventory model and a universal targeting expression which respectively map disparate inventory models and targeting expressions from distinct inventory management systems as well as mapping diverse audience and data models into a canonical framework that allows normalization across both inventory and audience. This permits representation in a uniform way in the TV marketplace application 210. This can be done across the different formats of television including addressable TV as well as data driven linear TV and connected TV and others, which may use different classification systems or creative serving.

Within the TV marketplace application 210, data may be organized according to a universal inventory model. This may include both historical data for a line item and also projected data. This includes both actual delivery numbers and, using the historical data set to build out a future data set give a universal inventory model. This allows treatment of future inventory as real inventory.

Figure 2C:
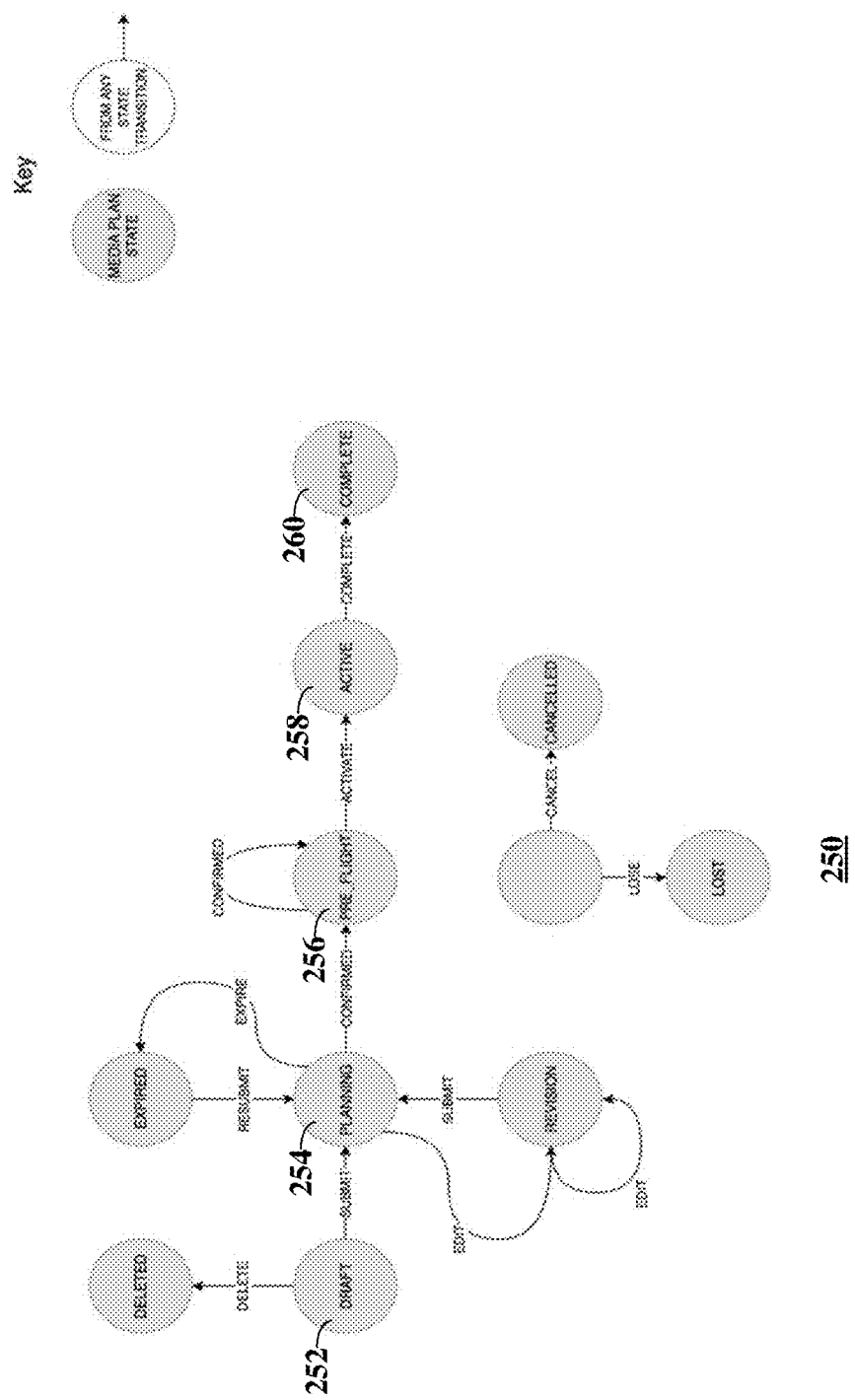
FIG. 2C is an illustrative, non-limiting embodiment of a state transition diagram illustrating aspects of operation of a multi-buyer, multi-seller media marketing system in accordance with various aspects herein.

FIG. 2C is an illustrative, non-limiting embodiment of a state transition diagram 250 illustrating aspects of operation of a multi-buyer, multi-seller media marketing system in accordance with various aspects herein. The state transition diagram 250 illustrates possible states of a deal for delivery of media content in the media content system 200 of FIG. 2A. The state transition diagram 250 illustrates the life cycle of a deal and types of conversions that can happen between states. The state transition diagram 250 reflects operation of the TV marketplace application 210 (FIG. 2B).

A deal begins in a draft state 252. In the draft state, a buyer of advertising can specify parameters or terms of the deal. The deal may also be referred to as a campaign, an advertising campaign or a flight. The TV marketplace application 210 facilitates this process. In one exemplary embodiment, during the draft state 252, the buyer accesses the TV marketplace application 210 to enter terms of the deal, in some embodiments using one or more web pages of a web interface. The buyer logs in to a website and works within the context of an ad account. The ad account will have a relationship with one or more seller accounts, such as accounts for an addressable TV network, a data driven linear TV network and other markets and networks. The ad account and the relationships to seller accounts control the workflow that the buyer will go through, including the web pages presented and options on those web pages. That will also control the sellers to which the advertiser will submit deals, as well as the ad inventory that the buyer will have access to.

In this exemplary embodiment, the buyer accesses the web page and specifies the terms of the deal. For example, the buyer sets an impression goal, a cost per mille (CPM) goal, and a campaign budget to spend. The buyer can allocate the budget across the specified sellers as well as specify a length of television commercial, such as 15 seconds or 30 seconds. The buyer can also specify a date range for the flight. The buyer can exclude particular networks and specify one or more targeted audience list identifiers or audience segments to be targeted. An example targeted audience list identifier is frequent car buyers.

In the draft state 252, there are two possible next states. The draft deal may be deleted if the buyer is no longer interested. Or the buyer may submit the deal and the deal may advance to the planning state 254.

After specifying the terms of the deal, the buyer submits the deal to sellers. One main goal of the deal is to generate requests for proposal (RFPs) that are presented to each specified seller. The terms of the deal specified by the buyer become a template for each RFP. Each RFP goes to a different seller account through the TV marketplace application 210. In some embodiments, each seller gets the same RFP unless the buyer specified different allocations, such as budget, that would create differences among the RFPs and the sellers.

The sellers in the negotiation process are independently interacting with the buyer in providing their proposal in response to the RFP, including how many impressions they are available to provide, as well as an indication of the seller's impression of the intersection of the buyer's desired audience with their own inventory. The buyer in effect receives a summary of all the audience counts for each of the sellers, as well as the amount of inventory. The TV marketplace application can sum the transmitted information to provide the buyer with segment counts. The buyer also specifies a desired frequency goal and a reach goal in the marketplace. The negotiation process operates to provide to the buyer an estimate of the size of the audience available. The buyer receives an estimate of the number of eyeballs available and how many of them the buyer can deliver an advertisement to.

Most TV advertisers have a different footprint or set of dayparts. That will vary across network providers. By collecting from sellers audience information, including temporal information about when certain audiences are available, the TV marketplace application can inform a buyer accordingly. Thus, the application can advise the buyer, for example, that while an audience of interest is available at a first time on a first network, substantially the same audience is available at a second time on a second network. Rather than targeting, say, prime time television with an appropriate budget, the buyer can hit the same audience at another time, say mid-day, with a reduced budgetary spend. In this way, the TV marketplace application can optimize a buy and optimize a seller's inventory. This operates to unlock the sellers' inventory as well, because without the information provided to the buyer by the TV marketplace application, buyers do not know the inventory is available.

In the planning state, orders within the deal are being negotiated as RFPs and proposals between buyers and sellers. The seller acknowledges the RFP and prepares a proposal. The proposal includes information about the audience to be provided and the size of the audience, including for example, the number of impressions the seller is capable of providing. The proposal is then submitted back to the buyer who can review to ensure that the proposal satisfies the buyer's requirements. If the proposal is agreed-upon, the seller is agreeing to provide the designated inventory of impressions at the price agreed upon. The buyer will select the number of impressions to be contracted and return the proposal to the seller as a contracted order.

The status of an order may include an RFP phase, for all states; a proposal phase, for all states; and an order, only after being submitted. A submitted deal in the planning or draft state 252 may expire of its own terms, if the buyer specified an expiration time, date or duration. The deal may be moved to the expiry state if the deal's expiry date is in the past or if all orders within the deal have expire. If the deal expires, it moves to the expired state. However, the deal may be resubmitted by the buyer, perhaps with an updated expiration time. Also, in the planning state 254, the deal may move to a revision state. In this state, in some embodiments, the seller may make revisions or counterproposals to the deal or the buyer may revise the deal. Upon editing a deal in the planning state 254, the deal moves to the revision state. If further revised, the deal may remain in the revision state until submitted again to the planning state 254.

Once the buyers and seller or sellers agree on terms of the deal, the deal is confirmed and moves to the pre-flight state 256. Preflight deals are deals where the start date of the deal has not been reached but at least one order has been confirmed. The pre-flight state 256 denotes that a guaranteed or contracted number of impressions has been finalized for the deal. If the deal is offered by the buyer to many sellers, if one seller accepts the deal, it does not mean that other sellers will accept the deal.

Given this, generally if one order is confirmed, and another order is rejected, the buyer will look to re-allocate the impressions to one of the confirmed orders. If an order moves from confirmed status to a change request status, the order should still remain in the planning state 254. A deal should remain in the planning state 254 while all orders are in one of the following states: RFP submitted; RFP rejected; RFP withdrawn; RFP expired; and RFP drafting. In some embodiments, if an order is confirmed by being accepted by a seller, it remains in the pre-flight state 256 but has a status of order|confirmed. If orders are not confirmed, this may have the potential to re-issue RFPs or submit change requests in order to ensure fulfillment of the total deal.

Upon activation, the deal moves from the pre-flight state 256 to the active state 258. The seller then operates to get the order into a delivery engine so it can begin delivering advertisements according to the contracted order. The TV marketplace application can be integrated with other advertising delivery systems, including digital, online, advertising delivery systems, to automatically deliver advertisements according to the contracted order.

Active deals in the active state 258 are deals which are currently between their start and end date. Note that a deal can be in active state but with no active orders. This will happen if the ready-to-air orders have not yet reached their start date, but the deal does contain confirmed orders that are not ready to air with start dates that have already passed. Once a deal is complete, it moves to the complete state 260. A complete deal in the complete state 260 is a deal for which the current date exceeds the end date specified for the deal. In some embodiments, a deal will not move to the complete state 260 if the current date equals the end date for the deal since, for TV advertising, conventionally, delivery is inclusive of the start and end dates.

As indicated in FIG. 2C, in some embodiments, a deal may have the state of lost or the state of cancelled. A deal may be moved to the lost state if, as an RFP, it has expired, been rejected or been withdrawn. A deal may be moved to the lost state if, as a proposal, it is rejected.

Figure 2D:
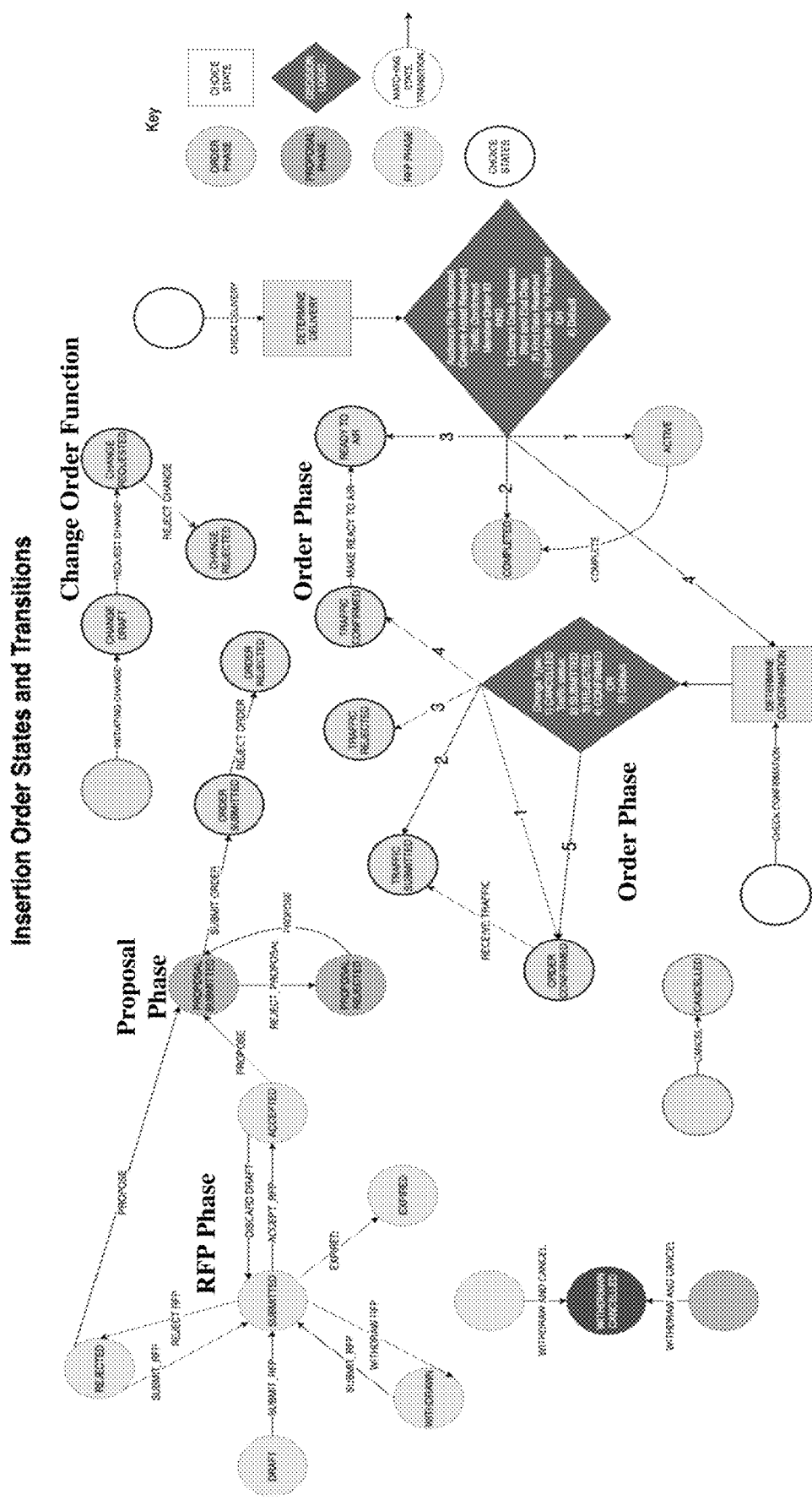
FIG. 2D is an illustrative, non-limiting embodiment of a state transition diagram illustrating workflow aspects of operation of a multi-buyer, multi-seller media marketing system implementing addressable TV advertising, in accordance with various aspects herein.

FIG. 2D is an illustrative, non-limiting embodiment of a state transition diagram 262 illustrating workflow aspects of operation of an insertion order in a multi-buyer, multi-seller media marketing system implementing addressable TV advertising, in accordance with various aspects herein. The state transition diagram 262 illustrates possible states of an insertion order for delivery of media content in an addressable TV system of the media content system 200 of FIG. 2A. In the illustrated embodiment, there is a hierarchy. A deal is a parent to an insertion order, an insertion order is a parent to an order line.

Figure 2E:
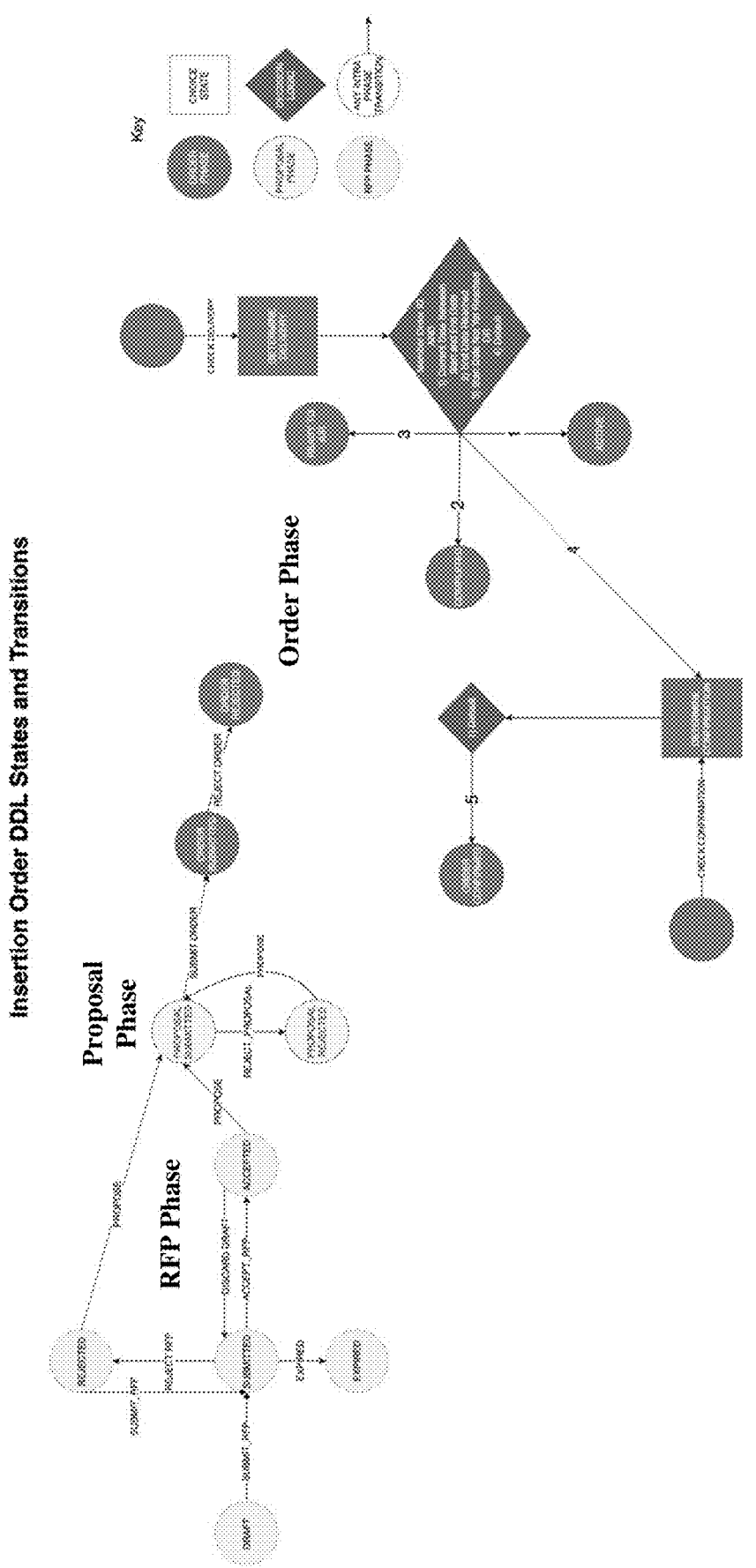
FIG. 2E is an illustrative, non-limiting embodiment of a state transition diagram illustrating workflow aspects of operation of a multi-buyer, multi-seller media marketing system implementing data driven linear TV advertising, in accordance with various aspects herein.

FIG. 2E is an illustrative, non-limiting embodiment of a state transition diagram 264 illustrating workflow aspects of operation of a multi-buyer, multi-seller media marketing system implementing data driven linear TV advertising, in accordance with various aspects herein. The state transition diagram 262 illustrates possible states of an insertion order for delivery of media content in a data driven linear TV system of the media content system 200 of FIG. 2A.

Figure 2F:
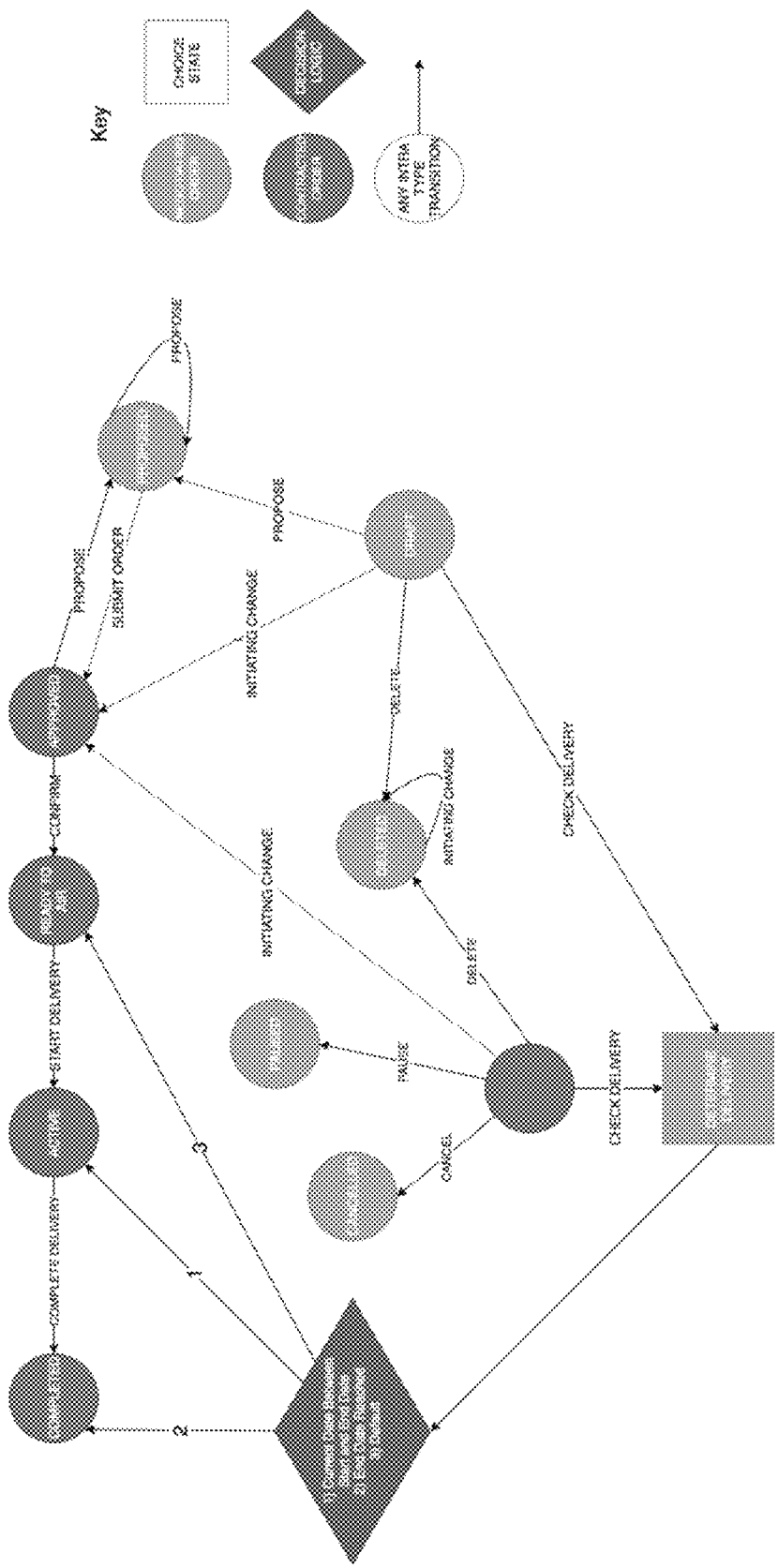
FIG. 2F is an illustrative, non-limiting embodiment of a state transition diagram illustrating workflow aspects of operation of a multi-buyer, multi-seller media marketing system implementing data driven linear TV advertising, in accordance with various aspects herein.

FIG. 2F is an illustrative, non-limiting embodiment of a state transition diagram 266 illustrating workflow aspects of operation of a multi-buyer, multi-seller media marketing system implementing data driven linear TV advertising, in accordance with various aspects herein.

FIG. 2C through FIG. 2F illustrate that there may be a large number of states and workflows, shown in FIGS. 2D, 2E and 2F, that exist within the core workflow, shown in FIG. 2C. Different systems need to be integrated and have their data sets converted to enable all workflows show in the state diagrams of FIG. 2C through FIG. 2F.

As illustrated in FIG. 2C and FIG. 2D, the insertion order state diagram is divided into three phases of its life cycle. These include an order phase, a proposal phase and an RFP phase. Transitions among the phases are determined by key events. An RFP transitions from RFP to proposal; a proposal transitions from proposal to an order. In the RFP phase, when a buyer submits an RFP, there are many changes that can happen after the RFP has been submitted. The RFP could be rejected, the RFP could be withdrawn, the RFP could expire, or the RFP could be accepted. If the RFP is accepted, a seller will take the details of the RFP, analyze the seller's inventory and decide to make a proposal, in the proposal phase. The order is then submitted, entering the order phase, and the buyer can accept or reject the order. The respective phases and states are listed below.

RFP Phase
    Received (seller)/Submitted (buyer)
        A deal has been submitted, and orders have been spun off from it.
    Drafting Response
        A seller has clicked to respond to the RFP
    Rejected
        A seller rejected the RFP by clicking the reject button
    Expired
        The expiry date of the RFP was reached
    Withdrawn
        A buyer has withdrawn an order manually by clicking the button Proposal Phase
    Submitted (sell side)/Received (buy side)
        A seller has created a proposal with order lines and submitted it to the buyer
    Rejected
        A buyer has rejected a seller's proposal by clicking reject in the UI Order Phase
    Received (sell side)/Submitted (buy side)
        A buyer has added contracted impressions and DMD IDs to a proposal and click to order within the UI.
    Change Requested
        A buyer has clicked to request a change to an existing order and submitted it.
    Change Rejected
        A seller has rejected the change request that a buyer made. A buyer is free to submit another change request against the original order.
    Confirmed
        A seller has either approved a change request or an original received order
    Traffic Received
        The buyer has uploaded a traffic file and the seller has also confirmed the order
    Traffic Rejected
        The seller confirmed the order but rejected the traffic instructions
    Traffic Confirmed
        The seller confirmed the order and confirm the traffic instructions
    Ready to Air
        The seller added the member order ids, completed the pre air checklist, and confirmed the traffic, before pressing ready to air in the UI.
    Active
        The order was in ready to air state and moved past its start date.
    Completed
        The order was active and moved past its end date.
    Cancelled
        A buyer submitted a cancellation request to the seller and the seller confirmed it.
    Order Rejected
        A seller rejected the buyers order. A buyer can submit a change order on top of this rejection back to the seller.

FIG. 2D also illustrates change order functionality. This is represented as a different workflow within the order phase, near the top of FIG. 2D. A buyer can make a change to an order the buyer has already committed to, such as adding more budget. The order moves in the state transition diagram from the buyer to the seller for a further approval process. The change is drafted, it can be requested and can then be accepted or rejected by the seller. Once the change is accepted, the order flows to the order confirmed state.

As noted, FIG. 2D relates to addressable TV advertising and FIG. 2E relates to data driven linear (DDL) advertising. In the illustrated, exemplary embodiments, the DDL workflow does not include the same requirements around traffic states near the center of FIG. 2D in the addressable TV workflow. Also, the change workflow is not integrated in the DDL workflow. The same general workflow and states are included in the DDL workflow, which may be considered to be a subset of the addressable workflow.

As shown in FIG. 2E, an order line includes a number of states. These include the following.

Active
  The line is between its start and end date
Cancelled
  A buyer requested a cancellation of the order and it was approved by the seller
Complete
  The line is after its end date
Proposed
  The line has been proposed by a seller, not yet confirmed/contracted by a buyer
Approved
  The line has been contracted by the buyer
Ready to Air
  The order line is before its start date. This could be a user entered order or a line imported from an external system While for purposes of simplicity of explanation, the respective processes are shown and described as a series of states in FIGS. 2C through 2F, it is to be understood and appreciated that the claimed subject matter is not limited by the order of the states, as some states may occur in different orders and/or concurrently with other states from what is depicted and described herein. Moreover, not all illustrated states may be required to implement the methods described herein.

Figure 2G:
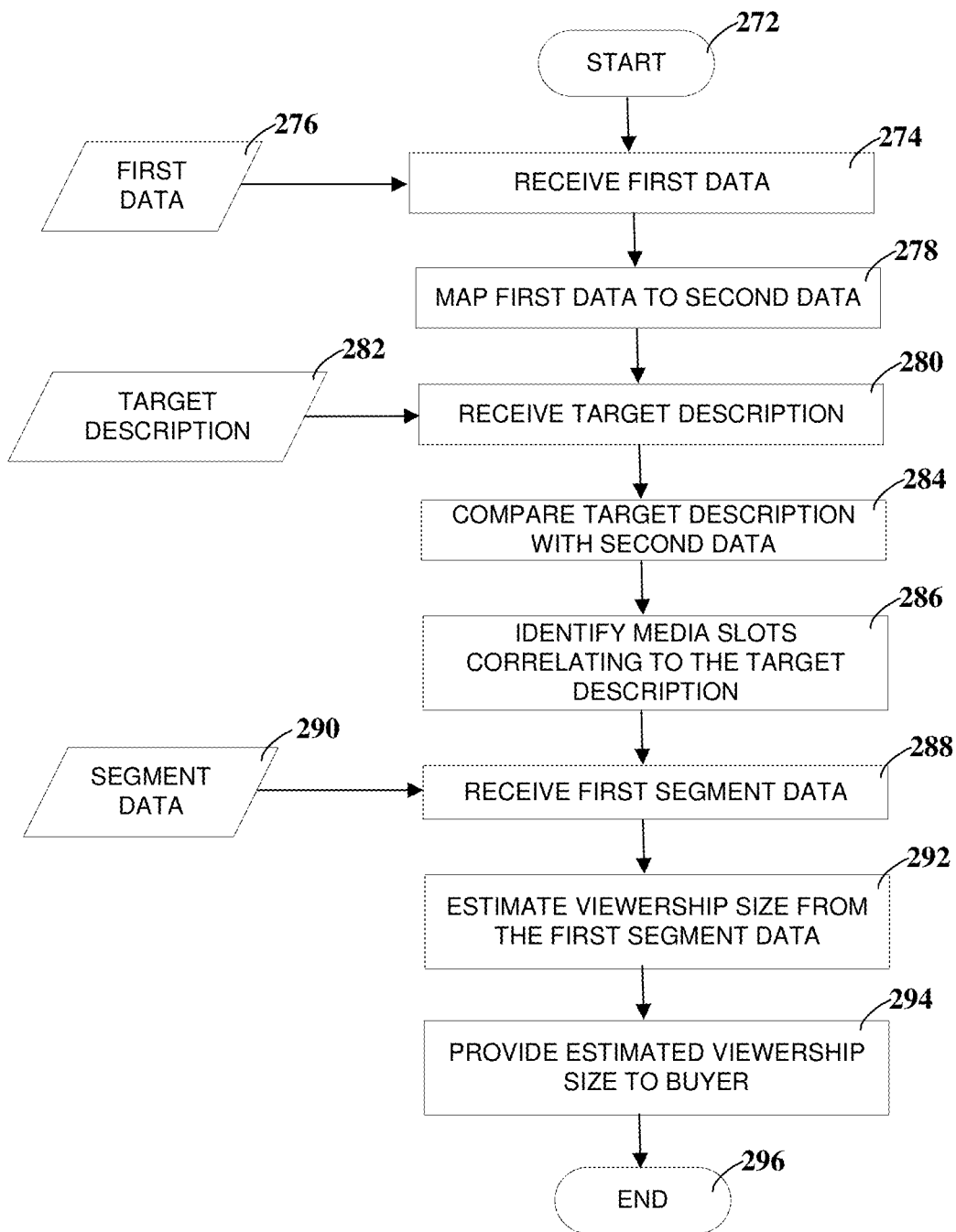
FIG. 2G depicts a non-limiting, illustrative embodiment of a method in accordance with various aspects described herein.

FIG. 2G depicts an illustrative embodiment of a method 270 in accordance with various aspects described herein. The method 270 may be suitable for implementing a multi-buyer, multi-seller media content marketplace. The method 270 may be implemented on any suitable data processing system including, for example, a processor and a memory or other data storage. The method begins at block 272.

At block 274, the method includes receiving first data from each media publishing system of a plurality of media publishing systems. The plurality of media publishing systems facilitate presentation of media content with one or more procurable media content slots. For example, the media publishing systems may be embodied in content delivery networks such as the delivery networks 218 of FIG. 2A. The media content slots may be embodied, in some examples, as impressions for future delivery or measurement data about past delivery on one or more publishing systems. In some embodiments, the first data 276 received from each media publishing system of the plurality of media publishing systems has incompatible data structures. For example, in some embodiments, the media publishing systems may include addressable TV systems, data driven linear TV systems, connected TV systems and digital advertising delivery systems. Each respective TV system may have its own data structure for reporting impressions delivered to end users and for providing media content to the end users.

Block 278 includes mapping the first data from each media publishing system of the plurality of media publishing systems to second data having a common data structure. To simplify handling of data from the media publishing systems, to improve data processing efficiency and storage by the processing system implementing the method 270, the disparate data formats or data structures received at block 274 are mapped to a uniform or common data format. Each media publishing system may measure an impression in a unique manner or report an impression in a unique manner or with unique format. For purposes of comparing and reporting information about impressions and audiences, a system such as the TV marketplace application 210 (FIG. 2A) may map the received data to a common data format. Other example mapping operations are exemplified by the data transformation process 244 and the data merge process 246 of FIG. 2B.

At block 280, the method 270 further includes receiving a target description from a media procurement system. The target description, such as target description 282, may include information to procure media content slots provided by one or more of the plurality of media publishing systems. The target description may define an audience of interest to a buyer or seller of media content. The target description may be organized as one or more audience segments defined by factors such as common interests, age and other demographics, location, etc. In some embodiments, the target description may take the form of a request for proposal (RFP) provided by a buyer operating in conjunction with the TV marketplace application 210, FIG. 2A. For example, the buyer may access a series of web pages provided by the TV marketplace application 210 and specify a proposed media buy. The proposal may include information such as number of impressions, a campaign budget and campaign start and stop times, and desired media publishing systems. The desired media publishing systems specified by the buyer may include, for example, one or more addressable TV systems, one or more data driven linear TV systems, one or more connected TV systems, one or more digital content delivery systems and others as well.

At block 284, the method 270 includes comparing the target description to the second data in the common data format. At block 286, the method includes identifying at least one procurable media content slot provided by one or more media publishing systems of the plurality of media publishing systems that correlates to the target description. For example, in some embodiments, the TV marketplace application 210 may use information defining one or more audience segments to identify a network and time of day having an audience matching audience segments specified by a buyer and contained in a TV deal. The procurable media content slots may be available and identified over any suitable media content delivery systems, including addressable TV systems of different network providers, data driven linear TV systems of different network providers, one or more connected TV systems of different network providers, one or more digital content delivery systems, and others as well.

At block 288, the method 270 may include a step of receiving first viewership data associated with viewership of media content presentations that include the at least one procurable media content slot. The first viewership data 290 may include data indicating viewers available to view media content at the time and on the network, and of the media type specified by the target description. In various embodiments, the first viewership data 290 may include data collected from set top boxes located at viewer households in an addressable TV system. The first viewership data 290 may include data collected from individual devices in a connected TV system. The first viewership data 290 may include panel data collected from a data driven linear TV system.

At block 292, the method further includes generating, according to the first viewership data, an estimated viewership size associated with the viewership of media content presentations that include the at least one procurable media content slot. Block 294 includes providing the estimated viewership to the buyer. The estimated viewership may be generated in any suitable manner. For example, the estimated viewership may specify potential viewers or impressions available on all media content delivery systems of interest to the buyer, where the buyer interest is determined from an RFP submitted to the buyer. The estimated viewership may be organized in any suitable fashion, such as by network or media content type, or by time of day such as dayparts. Further, the estimated viewership may include recommendations or alternatives for consideration by the buyer. For example, where the buyer indicates an interest in an audience having particular characteristics at a particular time of day or day of week, the estimated viewership may include a recommendation that a similar audience is available at a differ time or day, but at reduced cost. Other information about estimated viewership and audiences available may be provided as well. The method 270 ends at block 296.

While for purposes of simplicity of explanation, the respective processes are shown and described as a series of blocks or steps in FIG. 2G, it is to be understood and appreciated that the claimed subject matter is not limited by the order of the blocks or steps, as some blocks or steps may occur in different orders and/or concurrently with other blocks or steps from what is depicted and described herein. Moreover, not all illustrated blocks or steps may be required to implement the methods described herein.

FIG. 3A through FIG. 3O illustrate an example, non-limiting embodiment of a user interface 300 for a multi-buyer, multi-seller media marketing system. The multi-buyer, multi-seller marketing system may be similar to the TV marketplace device 202 implementing the TV marketplace application 210, FIG. 2A. The user interface 300 may be implemented by any suitable data processing system including a processor and memory. The processor may access data and instructions in the memory to perform operations. The operations may include, for example, generating one or more web pages as illustrated, for example, in FIGS. 3A-3O, and providing the web pages to data processing systems of one or more buyers of media content and one or more sellers of content. Thus, a buyer or seller, operating a computer such as a laptop computer, a tablet computer or mobile device, may access the TV marketplace device 202 and the TV marketplace application 210 to view and interact with the user interface 300 and the web pages illustrated in FIGS. 3A through 3O.

The exemplary user interface 300 may be accessed by a buyer or a seller of media content, including combinations of buyers and sellers. The user interface 300 manages the information presented on each respective web page to each respective participant in the multi-buyer, multi-seller media marketing system. Each participant may have access credentials to the multi-buyer, multi-seller media marketing system and, upon presenting appropriate access credentials by logging in, each participant may be presented with one or more web pages for reviewing information, entering data, initiating action and reviewing results.

FIG. 3A shows an exemplary deal screen 301 presented to a buyer after logging into the multi-buyer, multi-seller media marketing system. The deal screen 301 shows a search index for reviewing any deal that has been created. In the example of FIG. 3A, three deals are shown as respective line items on the deal screen 301. A first deal 302 is labelled with a deal name BMW 320i Promo Q3 2019. A second deal 303 is labelled with a deal name BMW 330i Promo Q3 2019. A fourth deal 304 is labelled with a deal name BMW 340i Promo Q3 2019. Each respective deal is listed with its deal state, its date of submission, its associated brand; an associated start date and end date; a requested number of impressions; a budget; and email address of a contact individual.

The exemplary deal page 301 includes navigation features including, in this example, a search box 305 and filter controls 306. A buyer accessing the deal page 301 may enter search text in the search box 305 to locate deals relevant to the search text. The filter controls 306 allow the buyer to display or sort only deals at a particular life stage. Each deal has a life cycle, as illustrated, for example, in FIG. 2C. Thus, the buyer can select a filter control among the filter controls 306 to view All deals (currently there are 3 total deals); to view only Draft deals (currently 1 viewable); to view Preflight deals (currently none viewable); to view Active deals (currently none viewable); to view Completed deals (currently none viewable); and to view Cancelled deals (currently none viewable).

Figure 3B:

FIG. 3B illustrates an exemplary deal overview page 307 which may be accessed and used by a buyer to create a new deal. Creating a new deal in this example corresponds to preparing a request for proposal or RFP. The RFP or deal may be submitted to one or more sellers who, after reviewing the deal, may respond by submitting a proposal to the buyer. The RFP and the proposals, if any, are prepared and automatically exchanged for example through the TV marketplace device 202 and the TV marketplace application 210 as displayed on the user interface 300.

The exemplary deal overview page 307 includes data entry selector 308 and data entry region 309. The data entry selector 308 allows the buyer accessing the deal overview page 307 to select a respective data entry point for entry of information defining a deal. Possible data entry points in the example of FIG. 3B include Deal Overview and Marketplace definition, shown in FIG. 3B, Creatives definition, Budget definition, shown in FIG. 3C, Flights definition, Inventory definition, Audiences definition and a Notes page, shown in FIG. 3E.

The data entry region 309 includes data entry fields for specifying information such as a name for the deal, an ad account associated with the deal, a priority level for the deal, and a deadline to respond. In this example, the deal being displayed corresponds to second deal 303 labelled with a deal name BMW 330i Promo Q3 2019 in FIG. 3A.

The buyer, as a user of the user interface 300, works within the context of an ad account. In the illustrated example, the designated ad account is AT&T Consumer 2019. The ad account may be specified by entering text in a text box or by selecting from a popup menu or other type of selector. Each ad account will have a relationship with one or more sellers. The relationships control the workflow that the buyer will go through to enable the deal and run it through its life cycle. The relationships also controls the sellers to whom the buyer will be submitting deals or RFPs.

That will also control the type of inventory into which the buyer will have visibility. The deadline to respond may correspond to the date by which a seller must respond to the request for proposal (RFP) associated with the deal.

The exemplary Marketplace definition data entry point 310 are populated on the deal overview page 307 once the ad account selector is specified by the buyer. In this example, the buyer has a relationship with three sellers, Xandr Addressable, WarnerMedia and Multi-Seller Marketplaces. These three possible marketplaces are displayed and made optionally selectable by the buyer on the user interface 300, for example by the buyer clicking a respective select box in a respective marketplace. The different marketplaces may correspond to different audience types. Thus, in the illustrated example, Xandr Addressable corresponds to an addressable television audience and WarnerMedia corresponds to a data driven linear television audience.

Figure 3C:
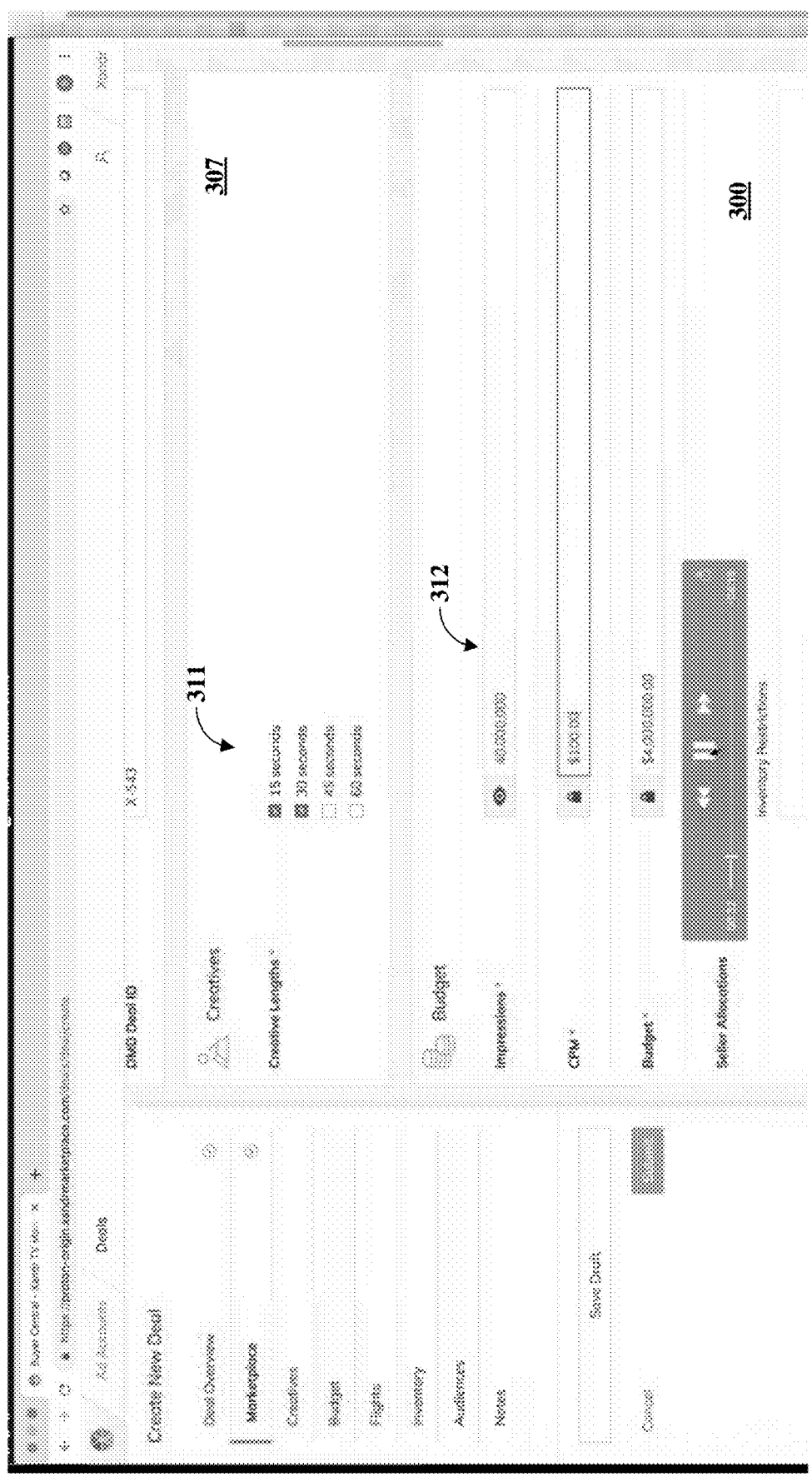

FIG. 3C illustrates an exemplary Creatives definition section 311 and a Budget definition section 312 of the deal overview page 307 which may be accessed and used by a buyer to create a new deal. The Creatives definition section 311 allows the buyer to specify information about the creatives that are the subject of the deal. In this example, the buyer may specify the duration of the creatives, such as 15, 30, 45 or 60 seconds. Other information may be specified as well in other embodiments.

The exemplary Budget definition section 312 allows the buyer to specify information about the budget for the deal or RFP. Examples of such information include number of impressions, a cost per mille (CPM), and a total budget.

Figure 3D:
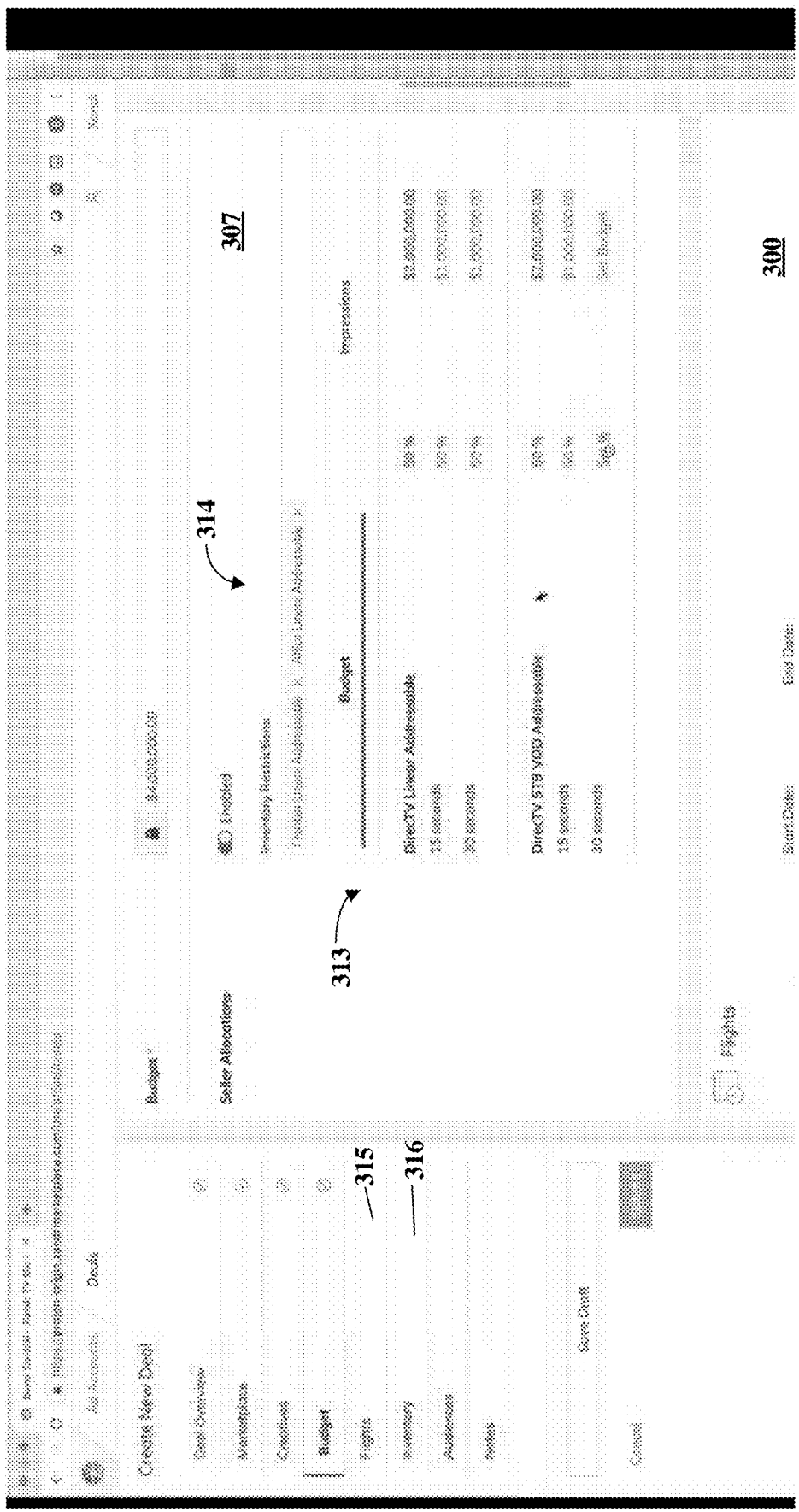

FIG. 3D illustrates an exemplary seller allocation section 313 and inventory restriction section 314 of the deal overview page 307 which may be accessed and used by a buyer to create a new deal. Once the total budget is set, the buyer has the opportunity in the seller allocation section 313 to allocate the total budget across the sellers. The allocation can be according to monetary budget amount, number of impressions or across a creative duration the buyer is trying to hit, or according to any other desired allocation. The allocation percentages and budget amounts may be entered into text boxes by the seller or the data may be entered in the user interface 300 in any convenient fashion. In the inventory restriction section 314, the buyer may restrict whether all participating seller accounts receive the RFP or if the buyer wants to restrict the RFP to a subset of seller accounts. Identification of the restricted sellers may be entered as text by the buyer or may be presented as a pop-up menu or selector upon actuation of an enable slider on the user interface 300 as illustrated in FIG. 3D.

The exemplary deal overview page 307, in the data entry selector 308, includes a flights definition section 315 and an inventory definition section 316. In an example embodiment, the flights definition section 315 may be actuated and present additional data entry or targeting definition features on the deal overview page 307. For example, the inventory definition section 316 may include data entry devices such as text entry boxes or a calendar with a selectable date range or selectable dates. The data entry device allows the buyer to specify, for example, a start date and an end date for a campaign or flight for the RFP. Moreover, the data entry device may be tailored to the type of seller or marketplace. Thus, for example, for a workflow for an addressable marketplace, flighting dates can be more fine-grained than for a linear marketplace which may adhere to a more traditional broadcast media calendar which may be divided into dayparts. In some embodiments, the flights definition section 315 may include a data entry device to enter restricted dates or restricted hours when advertising associated with the RFP will not be shown in the selected marketplace. Other flight definition information may be included as well.

The exemplary inventory definition section 316 may be actuated and present additional data entry or targeting definition features on the deal overview page 307. For example, the inventory definition section 316 may include data entry devices such as text entry boxes or pop-up menus or radio buttons to include or exclude some marketplaces. In one example, the user interface 300 may allow the buyer to exclude kids' networks with programming directed to children or Spanish language networks with programming in Spanish. Any other grouping of networks or marketplaces may be specified. In addition to broad exclusions by type, the inventory definition section 316 may include data entry devices for excluding particular named networks, such as Nickelodeon or Telemundo, while including in the inventory other kids' networks or Spanish-language networks. Other possibilities for inclusion or exclusion may be imagined as well.

Figure 3E:
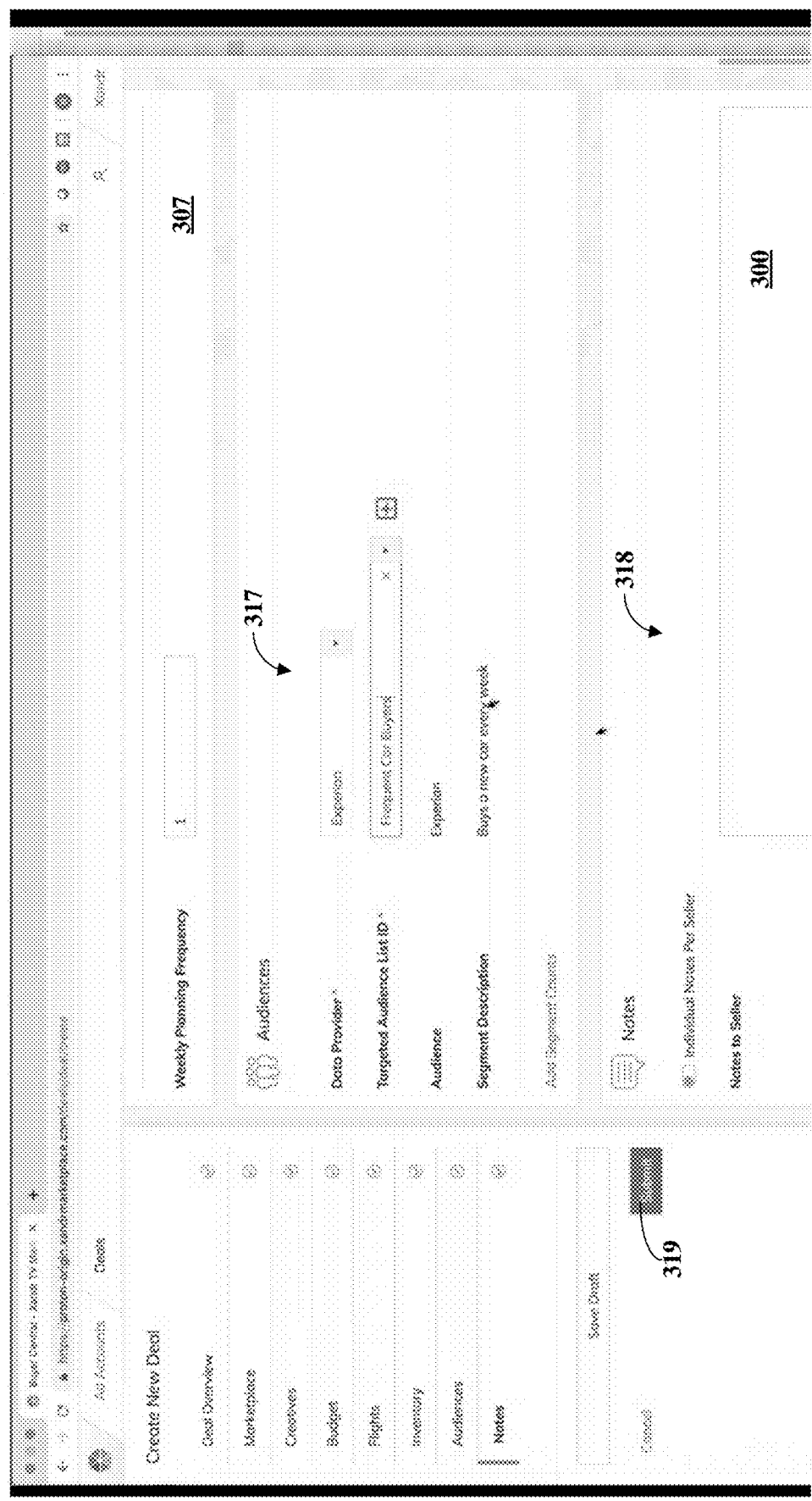

FIG. 3E illustrates an exemplary audience definition section 317 and a notes section 318 of the deal overview page 307 which may be accessed and used by a buyer to create a new deal. The audience definition section 317 allows a buyer to target closely audience segments of particular interest to the buyer for the RFP or deal. In the illustrated example, the buyer has selected using a pop-up menu an audience segment identified as Frequent Car Buyers, described as viewers who buy a car every week. Additional audience segments may be added. In this manner, even linear programming may be hyper-targeted at particular audience segments. The audience may represent a curated list of audience segments that are activated in the participating seller's delivery engines.

The notes section 318 includes a text box or other data entry tool for the buyer to provide additional information. The information may be provided to all sellers as a group or, by actuation of a slider on the user interface 300, the information may be provided as individual notes to a particular seller.

After a buyer has prepared all details of an RFP using the user interface 300, the buyer may select a submit button 319 of the user interface. Selection of the submit button 319 causes the multi-buyer, multi-seller marketing system, such as the TV marketplace device 202 implementing the TV marketplace application 210, to save to memory data defining the RFP.

Figure 3F:
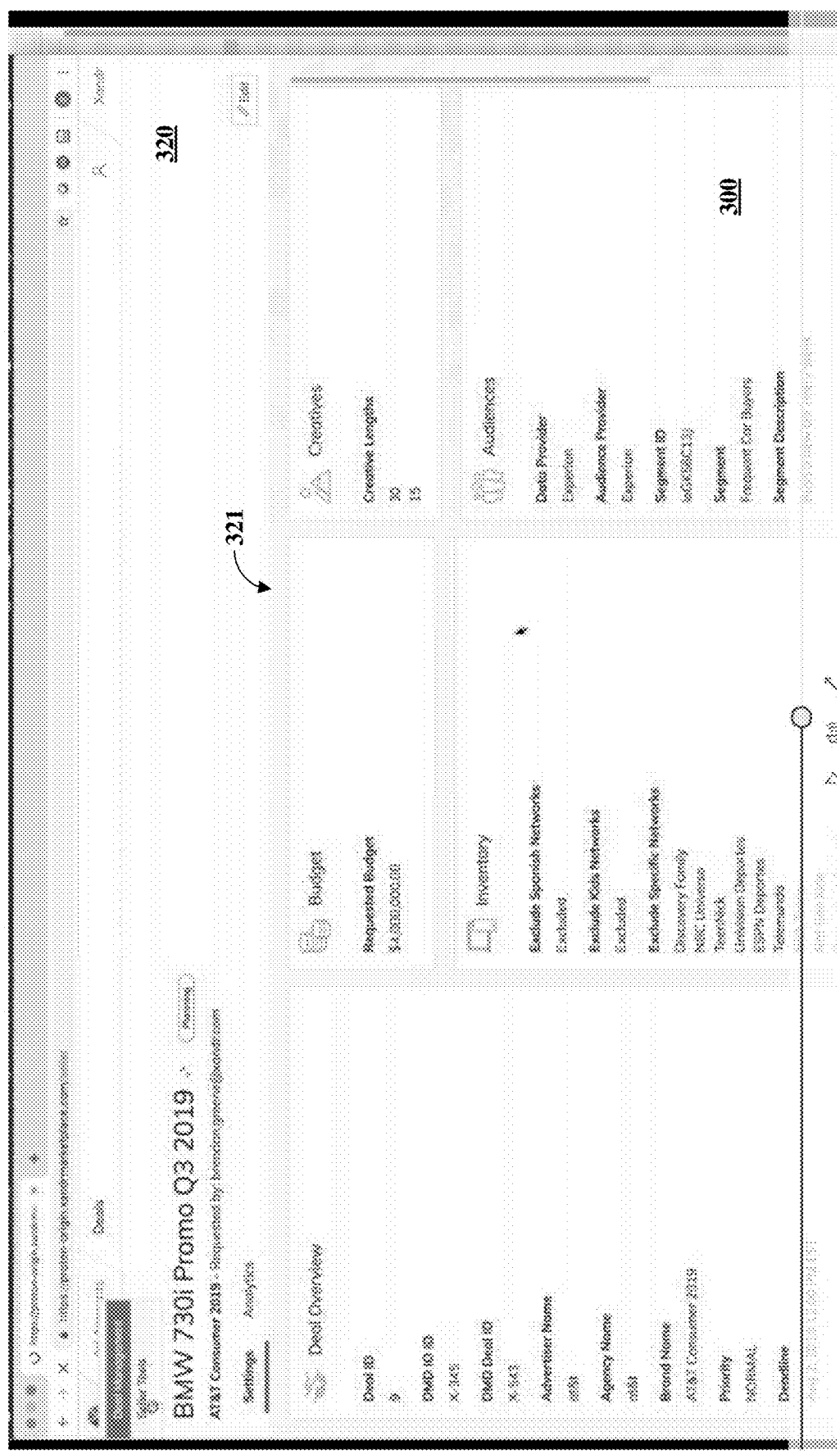

FIG. 3F illustrates an exemplary buyer's summary screen 320 after deal entry, or after actuation of the submit button 319 on the deal overview page 307. The buyer's summary screen 320 includes in this example a table or grid of all deal for the RFP prepared by the buyer, including a title or identifier for the deal, deal overview information such as an advertiser and agency name, budget information, inventory information, creatives information and audience information. Other information may be included and presented as well.

Figure 3G:
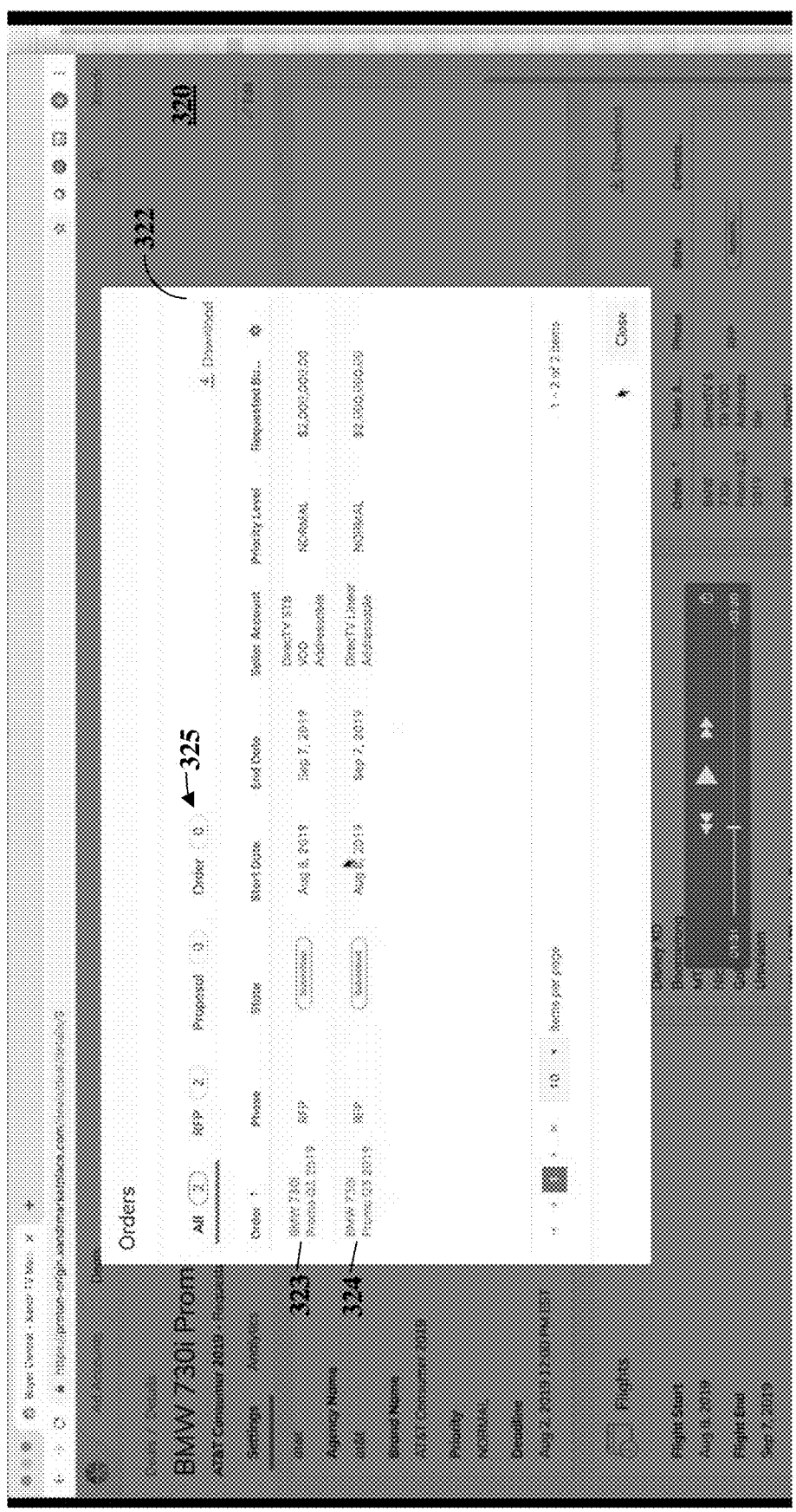

FIG. 3G illustrates the exemplary buyer's summary screen 320 with an exemplary order summary overlay 322. The order summary overlay 322 provides order summary information for deals prepared by the buyer. In the example of FIG. 3G, the order summary overlay 322 shows a first deal 323 and a second deal 324. The order summary overlay 322 includes a filter control device in the form of selectable buttons 325. The selectable buttons 325 are actuated so that the deal summary overlay displays all deals of the buyer and all RFPs of the buyer. No proposals and no orders are shown.

In the exemplary order summary overlay 322 of FIG. 3G, the information provided includes deal or order name, a phase such as RFP or proposal, a status such as submitted or accepted or cancelled, start and end dates, the seller or seller's targeted by each respective deal 323, 324, priority level and proposed budget. Other information may be presented as well, for the convenience of the buyer accessing the user interface.

Figure 3H:

FIG. 3H illustrates an exemplary seller's summary view 326 of the multi-buyer, multi-seller marketplace as displayed on the user interface 300. Information presented to the seller, such as in the seller's summary view 326, may be developed based on information provided by buyers to the multi-buyer, multi-seller marketplace. The buyers and sellers share data of a data processing system which implements the multi-buyer, multi-seller marketplace. Visibility rules of the multi-buyer, multi-seller marketplace control which participants in the marketplace can see which deals. The visibility rules are controlled by relationships defined in the marketplace between a buyer account and a seller account.

In exemplary embodiments, a buyer operates a buyer computer to provide data defining an RFP. Such data is illustrated in summary form in FIG. 3F and FIG. 3G and the buyer's data entry process to define a deal or RFP is illustrated in FIG. 3A through FIG. 3E. Once a deal has been defined and submitted, for example by actuation of the Submit button 319 of the user interface 300 in FIG. 3E, the information of the deal may be presented by the user interface 300 to one or more sellers defined by the terms of the deal. The exemplary user interface 300 includes web pages presented to and accessible by buyers and web pages presented to and accessible by sellers. In the illustrated example, the groups of buyer web pages and seller web pages of the user interface 300 form a user accessible aspect of the multi-buyer, multi-seller marketplace.

FIG. 3H shows an exemplary seller's summary view 326. The seller has logged in to the marketplace as a seller according to the seller's account. For example, the seller may provide suitable credentials to the data processing system that implements the multi-buyer, multi-seller marketplace. The credentials are associated with an account and the account includes information defining the seller's status as a seller. The seller receives one or more RFPs, including a first RFP 327, a second RFP 328, and a third RFP 329. For each deal, the exemplary seller's summary view 326 shows identification information for the deal, a state or current status of the deal such as Received or Cancelled, a name of an advertiser and a brand associated with the deal, start dates and end dates for the deal, and a seller account for the deal.

Figure 3I:
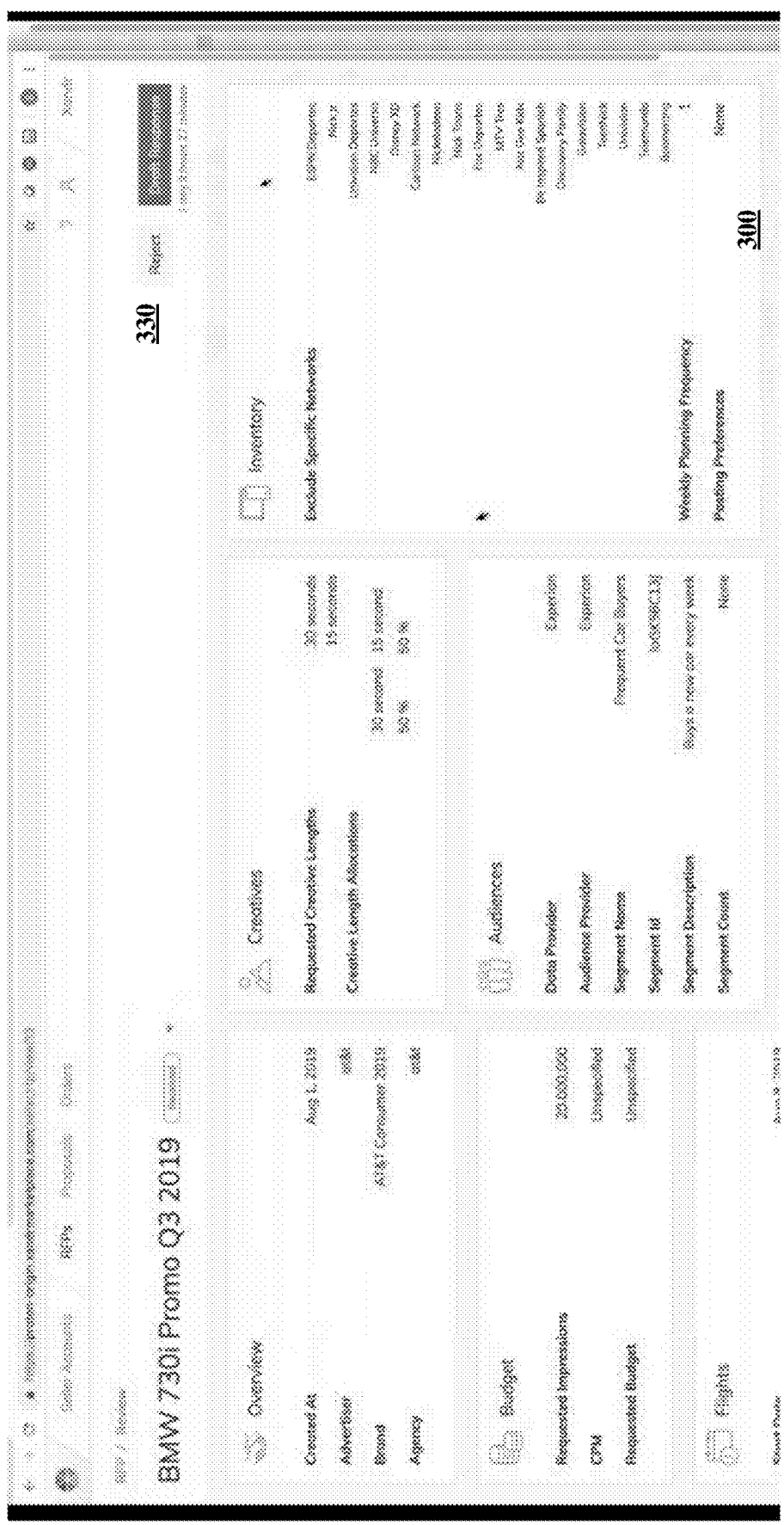

FIG. 3I shows an exemplary seller's summary screen 330 for a particular RFP. In one example, the seller may be notified of the availability of the RFP after the RFP is submitted by the buyer. The notification to the seller may come in the form of an electronic mail message to the seller, or in the form of a notification message within the multi-buyer, multi-seller marketplace system. The seller may use a mouse or other pointer device of the user interface 300 to select or click on one of the first RFP 327, the second RFP 328, or the third RFP 329 of FIG. 3H to access the seller's summary screen 330 for the selected RFP.

The exemplary seller's summary screen 330 displays details of the RFP as entered by the buyer. The seller may view the seller's summary screen 330 and review the details of the RFP. In the illustrated example, the details of the RFP include an overview of the RFP including a creation date, an advertiser, a brand and an agency associated with the RFP. Further in this example, the details of the RFP include information about the buyer's budget for the RFP, flights of the RFP, creatives or specifications for creatives of the RFP, audiences specified for the RFP and inventory for the RFP, such as excluded networks. Any other suitable information may be provided as well. Based on the review, the seller may decide to accept the RFP.

After reviewing the RFP, the seller may acknowledge the RFP. After reviewing the RFP, the seller may reject the RFP or accept it. In some embodiments, the seller may make modifications to the RFP and submit a counterproposal to the buyer through the multi-buyer, multi-seller marketplace system.

FIG. 3J illustrates an exemplary seller proposal page 331 which may be accessed and used by a seller to create a proposal based on an RFP received from a buyer. Creating a proposal in this example corresponds to responding to the RFP. For example, the seller may identify the size of the audience the seller estimates it is capable of hitting, for example by entering a segment count in an audience definition data entry block 332. Further, in an order line entry section 333, the seller may specify one or more order lines for the proposal. Each order line in this example specifies start and end dates, a number of proposed impressions for the advertising content and a creative length or duration of the creative to be presented. Other information may be presented or specified by the seller for the proposal as well. Once the terms of the proposal have been entered, the seller may actuate a Submit button 334 of the user interface 300.

Figure 3K:
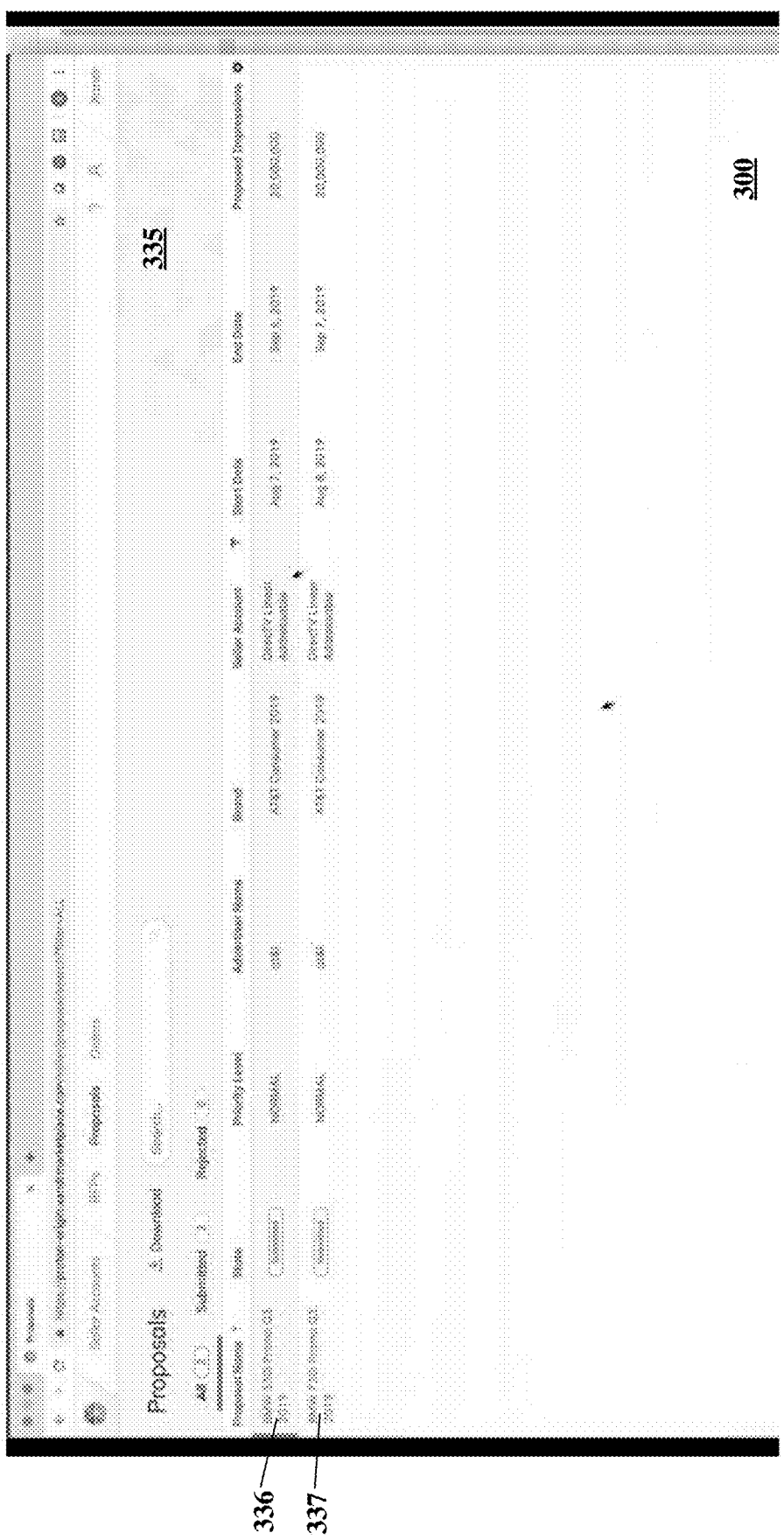

FIG. 3K illustrates an exemplary buyer proposal review page 335 displayed in the user interface 300. In the example of FIG. 3K, two proposals including a first proposal 336 and a second proposal 337 have been received by the buyer from sellers within the multi-buyer, multi-seller marketplace system. The proposals 336, 337 may be reviewed by the buyer and, if appropriate, accepted by the buyer to complete a deal. The buyer proposal review page 335 displays information for each proposal. In the example, the displayed information includes an identifier and a status for each proposal. Other information displayed includes the name of the advertiser and brand associated with each proposal, the seller account associated with each proposal, start and end dates and proposed impressions for each proposal. The information displayed to the buyer is based on and matches the information entered by the seller associated with each proposal when the seller prepared and submitted the proposal to the multi-buyer, multi-seller marketplace system.

Figure 3L:

FIG. 3L illustrates an exemplary buyer proposal detail review page 338 displayed in the user interface 300. In the example of FIG. 3L, the buyer proposal detail review page 338 displays details of the proposal received by the buyer from a seller in the multi-buyer, multi-seller marketplace system. The buyer may review the details of the proposal and decide to agree to terms of the proposal. The buyer proposal detail review page 338 lists impression information including the number 339 of impressions requested by the buyer when the buyer created the RFP and the number 340 of impressions proposed by the seller when the seller prepared the proposal. Also, the buyer can accept some subset of the impressions proposed by the seller, including all proposed impressions or fewer than all proposed impressions. Thus, there is a data entry area 341 to receive the buyer's contracted number of impressions. Similar information may be displayed for requested budget, proposed budget and contracted budget if those are terms of interest.

The exemplary buyer proposal detail review page 338 of FIG. 3L further includes order lines for displaying and receiving details of specific orders for the proposal. A first order line 342 specifies that, of the 10,000,000 proposed impressions for a creative having a 30 second duration, 8,000,000 impressions are contracted impressions. The buyer has entered the number 8,000,000 in the contracted impression data entry area 343. Similarly, a first order line 344 specifies that, of the 10,000,000 proposed impressions for a creative having a 15 second duration, 5,000,000 impressions are contracted impressions. The buyer has entered the number 5,000,000 in the contracted impression data entry area 345.

Figure 3M:
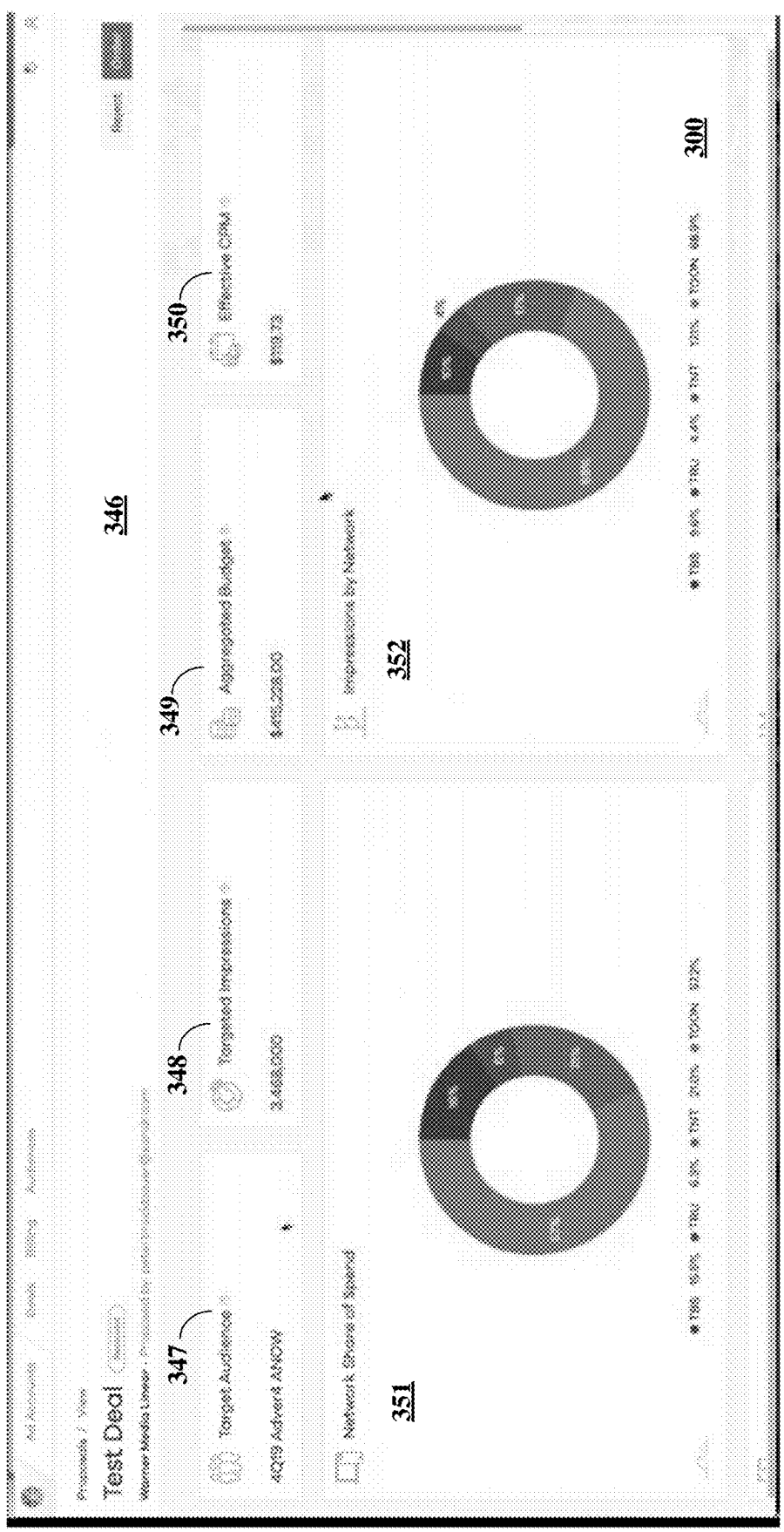
Figure 3N:
Figure 30:
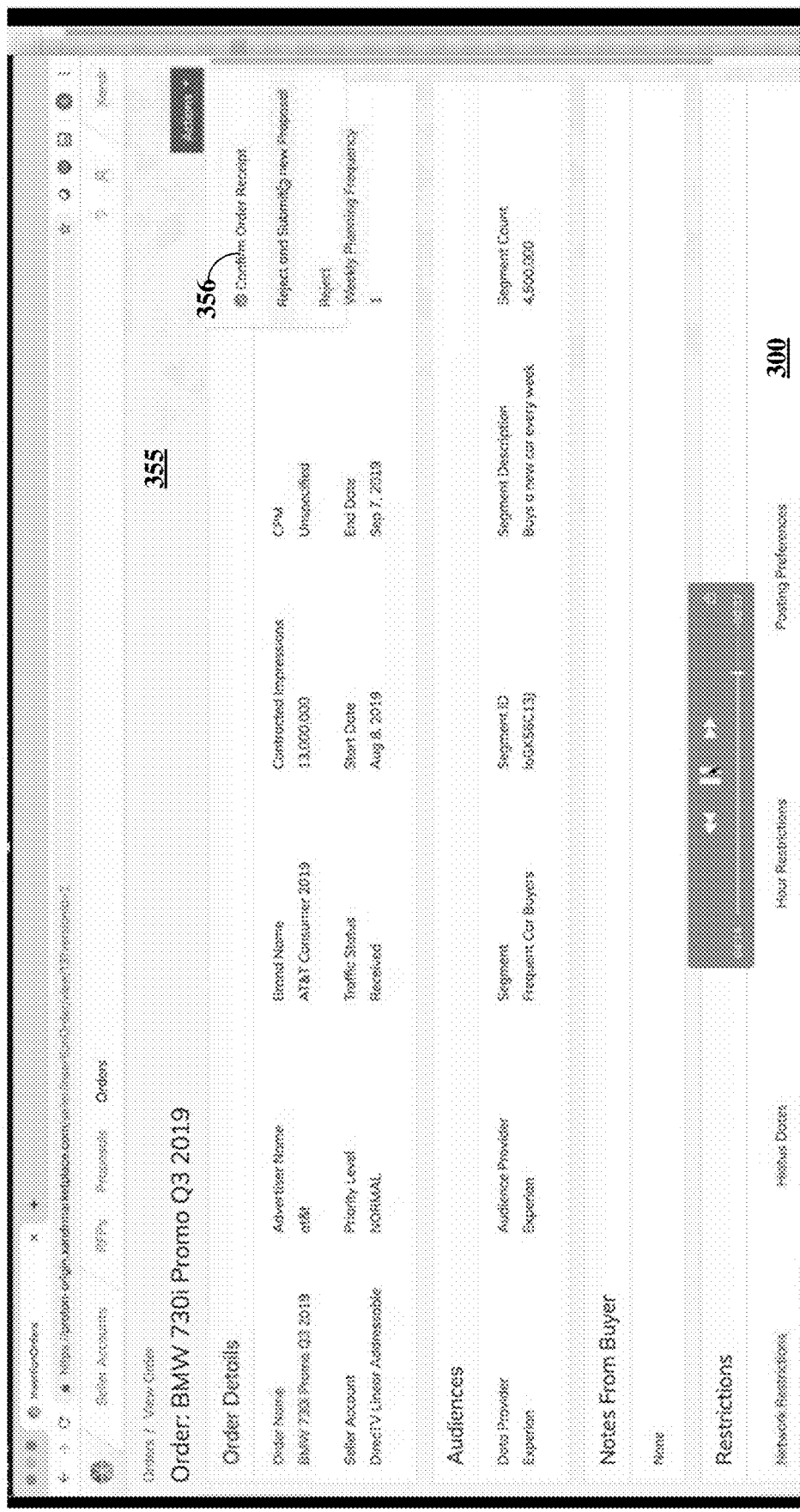
Figure 3P:
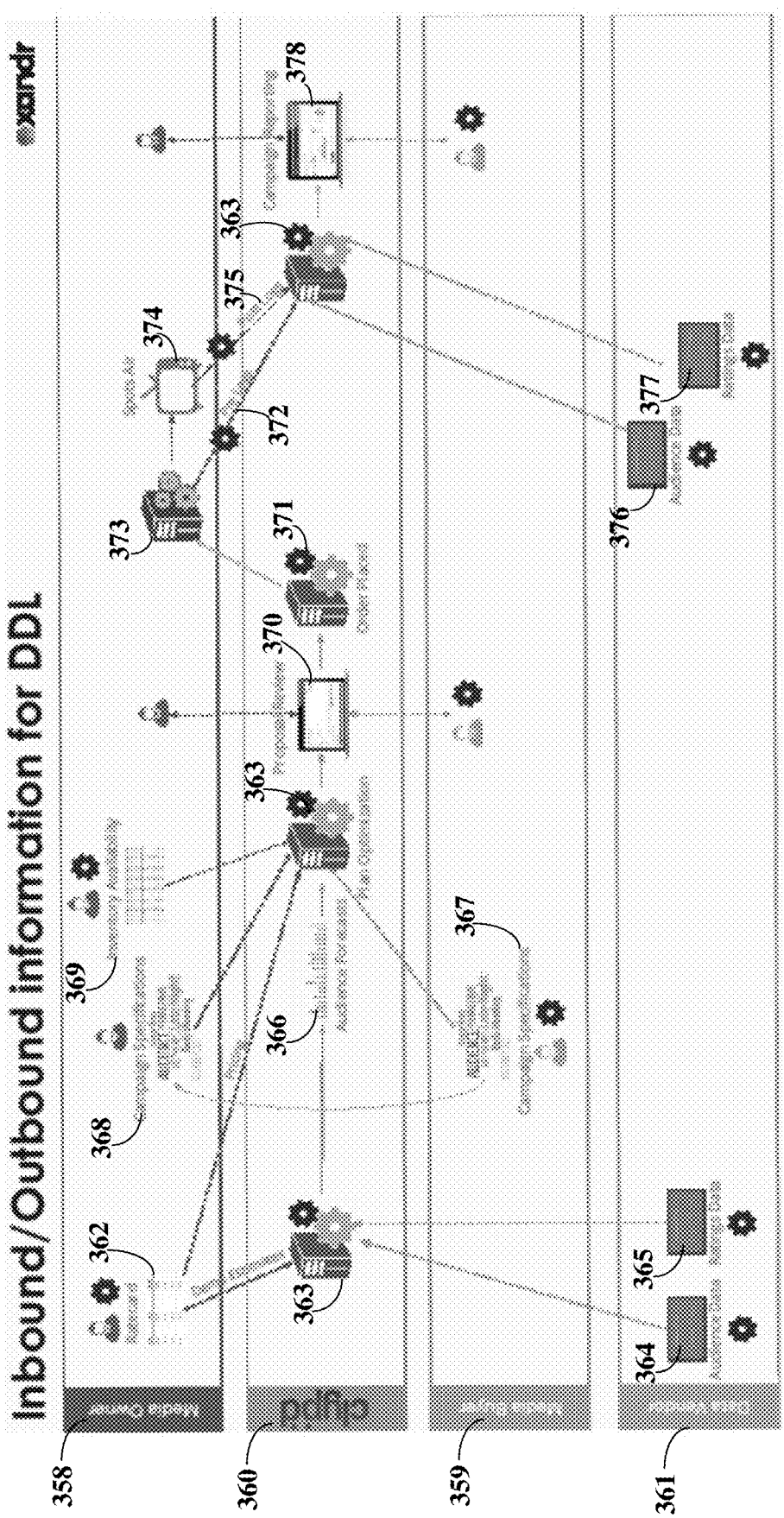

FIG. 3M illustrates a first view of an exemplary buyer audience estimate preview page 346 displayed in the user interface 300. The buyer audience estimate preview page 346 provides to the buyer information about an estimated audience for the deal. Note that the deal illustrated in FIG. 3M is not the same deal as the deal illustrated in FIGS. 3A-3L. In particular, the example of FIGS. 3A-3L is focused on an RFP, a proposal and a deal for addressable television delivery of content. The example of FIGS. 3M-3N is focused on a deal for data driven linear delivery of content. However, the principles disclosed, particularly information that may be presented to buyer and seller through the user interface 300, may be readily extended across multiple examples, including those illustrated in the drawing. The buyer audience estimate preview page 346 includes target audience information 347, targeted impressions information 348, aggregated budget information 349 and effective cost per mille (CPM) information 350. Further, the buyer audience estimate preview page 346 includes network share of spend information 351 presented in graphical form. Still further, the buyer audience estimate preview page 346 includes impressions by network information 352, again presented in graphical form. The network share of spend information 351 and the impressions by network information 352 for the deal illustrated in the example of FIG. 3M are illustrated for four content delivery networks, TBS, TRU, TNT and TOON.

FIG. 3N illustrates a second view of the exemplary buyer audience estimate preview page 346 displayed in the user interface 300. The second view of FIG. 3N shows a different, lower portion of the buyer audience estimate preview page 346 of FIG. 3M, scrolled down by the buyer to view the different, lower portion. In the second view of FIG. 3N, the buyer audience estimate preview page 346 includes spend by daypart information 353 and spot delivery by daypart information 354.

Upon reviewing the buyer audience estimate preview page 346, the buyer may obtain and estimated viewership size associated with the viewership of media content presentations that are part of the deal. The estimated viewership size includes an estimated target audience, for example presented as the target audience information 347, and target impressions, for example presented as the targeted impressions information 348. Other viewership data could be presented as well. The viewership data may be based on information provided by the seller in the proposal, including proposed impression information The buyer audience estimate preview page 346 illustrated in FIGS. 3M and 3N is exemplary only. Any other useful information may be displayed to the buyer.

After review and completing by the buyer, the order displayed in the buyer proposal detail review page 338 is submitted through the multi-buyer, multi-seller marketplace system to the seller as a contracted order.

FIG. 3O illustrates an exemplary seller order confirmation page 346 displayed in the user interface 300. In the example of FIG. 3O, the details of the order may be reviewed by the seller. The seller order confirmation page 355 includes a seller action entry area 356 which gives the seller options to confirm the receipt of the order from the buyer, to reject the order and submit a new proposal to the buyer, or simply reject the order. The order may be rejected if the seller no longer has a suitable inventory of impressions to sell, for example. If the order is accepted and confirmed, the details of the order may be forwarded to traffickers to enter the order into delivery engines.

FIG. 3P illustrates inbound and outbound flow of information in a media content system 357 which may be similar to some aspects to the media content system 200 of FIG. 2A. The embodiment of FIG. 3P particularly illustrates information flow in a data driven linear (DDL) television system. However, the principles, structure and operation exemplified in FIG. 3P may be extended to any suitable system, including a multi-buyer, multi-seller content placement system in which content is provided to a variety of channels, such as DDL TV, addressable TV, connected TV, over the top (OTT) systems and others. The illustration and discussion of FIG. 3P are intended to be general to all content provision systems.

The embodiment of FIG. 3P illustrates interactions among four parties, including a media owner 358, a media buyer 359, a marketplace operator 360 and a data vendor 361, operating in the media content system 357. The media owner 358 has media such as advertising content to provide. The media owner 358 may be an advertiser, and advertising agency or other similar market participant. The media owner 358 may also be referred to as a seller of media. The media buyer 359 provides content such as television programming and seeks to buy media such as advertising content to provide with the content. The media buyer 359 may be a publisher or operate a media content to a media network such as a television network. In the example embodiment, the media buyer operates a DDL TV network. The media buyer 358 generates and provides rate card information 362 including demographic (demo) estimates.

The marketplace operator 360 operates a data processing system 363 or systems that functionally bring together media owners such as the media owner 358 and media buyers such as the media buyer 359. FIG. 3P shows only a single media owner 358 and a single media buyer 359. However, this is intended to be illustrative only and in more general cases, the marketplace operator 360 will operate to bring together multiple media owners and multiple media buyers for placement of media content. The data processing system 363 of the marketplace operator 360 receives the rate card information 362 from the media owner 358.

The data vendor 361 collects, processes and provides to the media content system 357 information about audiences who view content. Audiences include persons who view programming including advertising on any content provision system such as a television network. This may include addressable TV networks, DDL TV networks, connected TV networks and others. The information about audiences includes audience data 364 and ratings data 365. The data vendor 360 provides audience data 362 and ratings data 363 to the data processing system 363 of the marketplace operator 360.

The audience data 364 may include any information, organized in any suitable form or format, about viewers of programming. For example, the audience data may be organized according to audience segments, where each audience segment may be represented by a Boolean expression of audience member characteristics. The characteristics may be, for example, demographic, geographic, psychographic or behavioral in nature. An audience segment in the audience data may be defined as men aged 45 to 55 having an interest in buying a new car. Other organizations or presentations of audience data may be used as well. Also, audience data 364 originating with different sources, such as different content provision systems, may be provided by the data vendor 361 in different formats, which may be incompatible.

The ratings data 365 may include information about relative popularity of media content programming presented on one or more media content networks. In one example, the ratings data 363 may be presented as a portion or percentage of a total audience that viewed particular programs, broken down according to time, such as dayparts, date, demographic group, geography, etc. Other formats and presentations may be used for the ratings data 365 as well. The ratings data 365 may be collected by the data vendor 361 or acquired by the data vendor 361 from another source, such as a ratings agency.

The marketplace operator 360 responds to the demo estimates from the media owner 358 and the audience data 364 and ratings data 365 from the data vendor 361 to generate audience forecasts 366. The audience forecasts 366 may be information about and estimate of one or more audiences for programming to be provided in the future. The audience forecasts 366 may be generated in any suitable manner and may be presented in any manner, such as according to dates and dayparts, according to audience segments, etc.

The marketplace operator 360 receives from the media buyer 359 campaign specification information 367. The campaign specification information 367 may include information defining an advertising or other media placement. For example, the campaign specification information 367 may include information defining characteristics of an audience of interest, start and stop dates for an advertising campaign, budget information, etc. In some examples, the campaign specification information 367 may be in the form of a request for proposal (RFP) for review and response by multiple sellers such as the media owner 358.

The marketplace operator 360 receives from the media owner 358 campaign specification information 368 and inventory availability information 369. The campaign specification information 368 may include details of a proposed advertising campaign to place advertising content with television programming or other content. The campaign specification information 368 may include details such as the audience desired, as defined by demographics, audience segments, etc., campaign start and end dates, the media items to be placed, and other information. The inventory availability information 369 may include information about impressions available to receive and present media content such as advertising to viewers on one or more media content channels. The campaign specification information 368 and inventory availability information 369 may be presented to the marketplace operator 360 in the form of a proposal responsive to the RFP from the media buyer. The campaign specification information 367 and the campaign specification information 368 and inventory availability information 369 are provided to the data processing system 363 of the marketplace operator 360.

Based on the campaign specification information 367, the campaign specification information 368 and inventory availability information 369, the audience data 364 and the ratings data 365, the data processing system 363 of the marketplace operator 360 performs a plan optimization function. Based on the plan optimization function, a proposal 370 is prepared by the data processing system 363 of the marketplace operator 360 and presented to the media owner 358 and the media buyer 359. If the proposal 370 is approved by the media owner 358 and the media buyer 359, an order is placed to initiate the campaign 371.

After placing the order, the marketplace operator 360 collects pre-log information 372 from a data processing system 373 of the media owner 358. Subsequently, the advertisements 374 which are the subject of the campaign are presented to viewers, in this example in a DDL TV system. Following presentation of the advertisements 374, post-log information 375 are collected by the data processing equipment 363 of the marketplace operator. Further, audience data 376 and ratings data 377 are collected by the data processing system 363 of the marketplace operator 360. Responsive to the pre-log information 372, the post-log information 375, the audience data 376 and the ratings data 377, the data processing system 363 of the marketplace operator 360 develops a campaign report 378 and provides the campaign report 378 to the media owner 358 and the media buyer 359. The media owner 358 and the media buyer 359 may use the campaign report 378 to judge the effectiveness of the campaign and to prepare or propose additional campaigns in the future.

Figure 4:
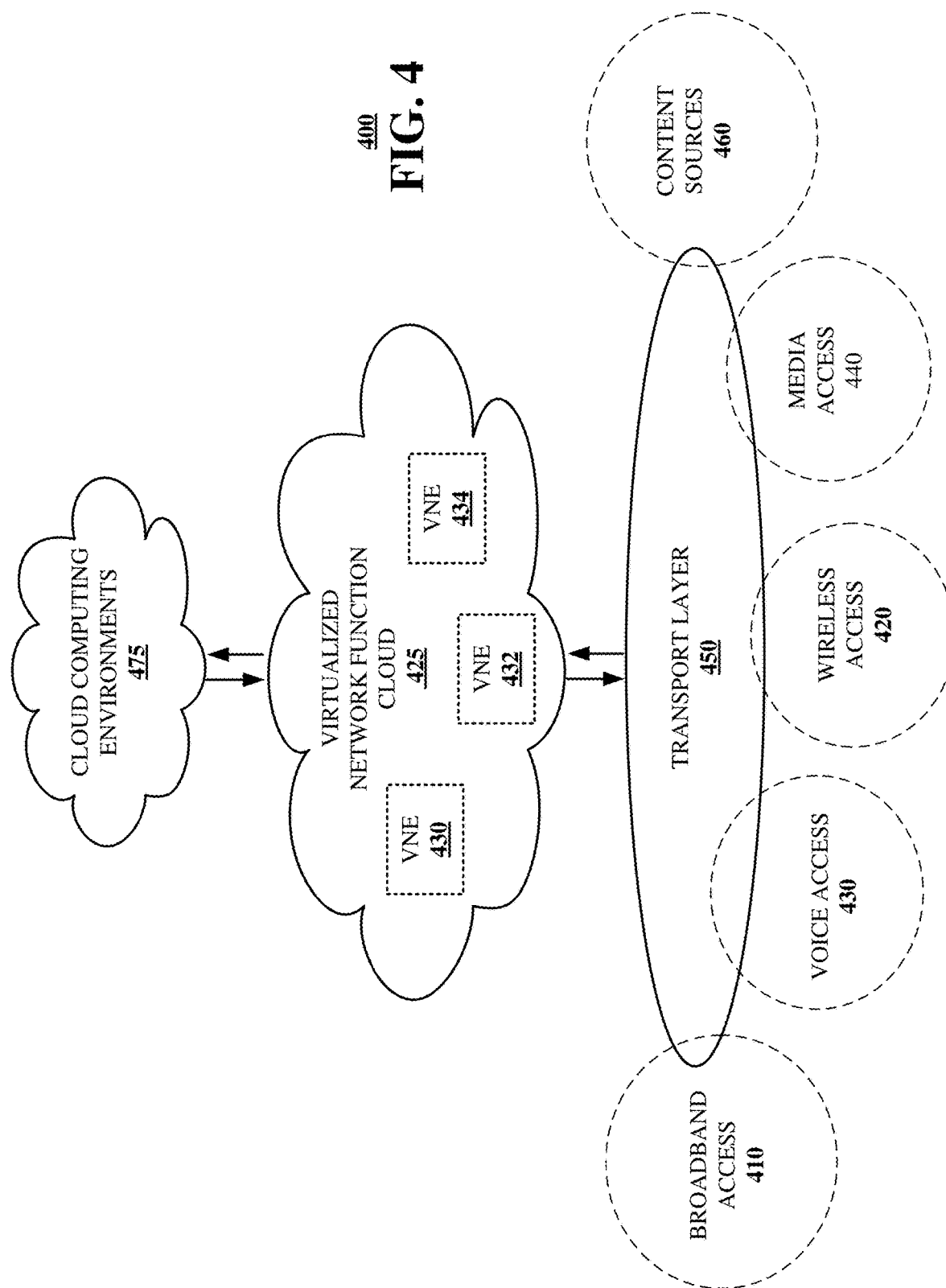
FIG. 4 is a block diagram illustrating an example, non-limiting embodiment of a virtualized communication network in accordance with various aspects described herein.

Referring now to FIG. 4, a block diagram is shown illustrating an example, non-limiting embodiment of a virtualized communication network 400 in accordance with various aspects described herein. In particular a virtualized communication network is presented that can be used to implement some or all of the subsystems and functions of communication network 100, the subsystems and functions of media content system 200, and method 270 presented in FIGS. 1, 2A, 2B, 2C, 2G, and 3A through 3P. For example, virtualized communication network 400 can facilitate in whole or in part a multi-buyer, multi-seller media content marketplace which receives data from media publishing systems and a target description from a media procurement system, identifies procurable media content slots corresponding to the target description and generates estimate viewership size for the procurable media content slots. The virtualized communication network 400 can operate in conjunction with a TV advertising marketplace among buyers and sellers for placement of media content among a plurality of media publishing systems including broadcast, cable, addressable, data driven liner and connected TV systems, among others.

In particular, a cloud networking architecture is shown that leverages cloud technologies and supports rapid innovation and scalability via a transport layer 450, a virtualized network function cloud 425 and/or one or more cloud computing environments 475. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 430, 432, 434, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 430 composed of NFV software modules, merchant silicon, and associated controllers. The software can be written so that increasing workload consumes incremental resources from a common resource pool, and moreover so that it's elastic, so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 450 includes fiber, cable, wired and/or wireless transport elements, network elements and interfaces to provide broadband access 410, wireless access 420, voice access 430, media access 440 and/or access to content sources 460 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front-ends (AFEs) that do not lend themselves to implementation as VNEs 430, 432 or 434. These network elements can be included in transport layer 450.

The virtualized network function cloud 425 interfaces with the transport layer 450 to provide the VNEs 430, 432, 434, etc. to provide specific NFVs. In particular, the virtualized network function cloud 425 leverages cloud operations, applications, and architectures to support networking workloads. The virtualized network elements 430, 432 and 434 can employ network function software that provides either a one-for-one mapping of traditional network element function or alternately some combination of network functions designed for cloud computing. For example, VNEs 430, 432 and 434 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 430, 432, 434, etc. can be instantiated and managed using an orchestration approach similar to those used in cloud compute services.

The cloud computing environments 475 can interface with the virtualized network function cloud 425 via APIs that expose functional capabilities of the VNEs 430, 432, 434, etc. to provide the flexible and expanded capabilities to the virtualized network function cloud 425. In particular, network workloads may have applications distributed across the virtualized network function cloud 425 and cloud computing environment 475 and in the commercial cloud or might simply orchestrate workloads supported entirely in NFV infrastructure from these third party locations.

Figure 5:
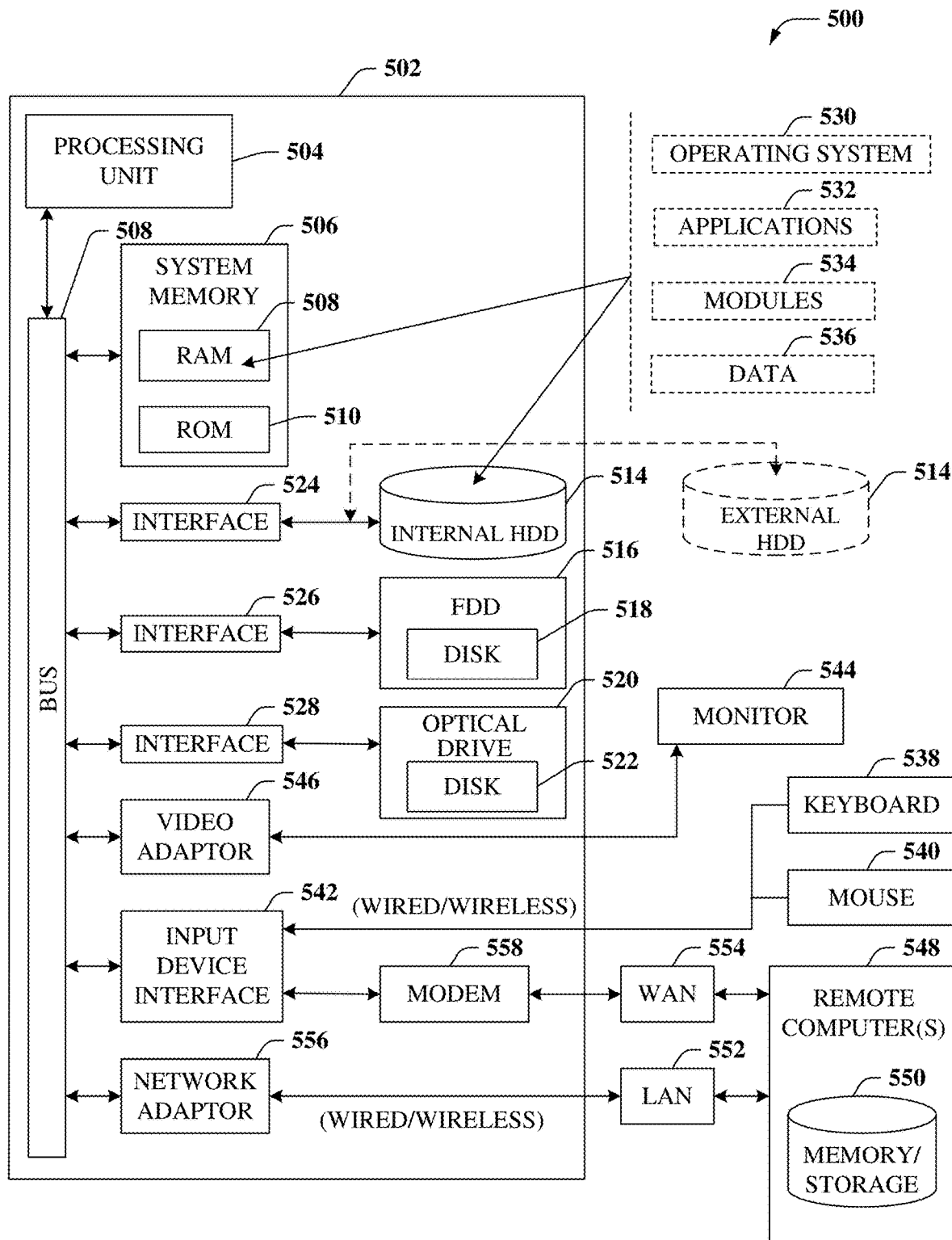
FIG. 5 is a block diagram of an example, non-limiting embodiment of a computing environment in accordance with various aspects described herein.

Turning now to FIG. 5, there is illustrated a block diagram of a computing environment in accordance with various aspects described herein. In order to provide additional context for various embodiments of the embodiments described herein, FIG. 5 and the following discussion are intended to provide a brief, general description of a suitable computing environment 500 in which the various embodiments of the subject disclosure can be implemented. In particular, computing environment 500 can be used in the implementation of network elements 150, 152, 154, 156, access terminal 112, base station or access point 122, switching device 132, media terminal 142, and/or VNEs 430, 432, 434, etc. Each of these devices can be implemented via computer-executable instructions that can run on one or more computers, and/or in combination with other program modules and/or as a combination of hardware and software. For example, computing environment 500 can facilitate in whole or in part a multi-buyer, multi-seller media content marketplace which receives data from media publishing systems and a target description from a media procurement system, identifies procurable media content slots corresponding to the target description and generates estimate viewership size for the procurable media content slots. The computing environment 500 can operate in conjunction with a TV advertising marketplace among buyers and sellers for placement of media content among a plurality of media publishing systems including broadcast, cable, addressable, data driven liner and connected TV systems, among others.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 5, the example environment can comprise a computer 502, the computer 502 comprising a processing unit 504, a system memory 506 and a system bus 508. The system bus 508 couples system components including, but not limited to, the system memory 406 to the processing unit 504. The processing unit 504 can be any of various commercially available processors. Dual microprocessors and other multiprocessor architectures can also be employed as the processing unit 504.

The system bus 508 can be any of several types of bus structure that can further interconnect to a memory bus (with or without a memory controller), a peripheral bus, and a local bus using any of a variety of commercially available bus architectures. The system memory 506 comprises ROM 510 and RAM 512. A basic input/output system (BIOS) can be stored in a non-volatile memory such as ROM, erasable programmable read only memory (EPROM), EEPROM, which BIOS contains the basic routines that help to transfer information between elements within the computer 502, such as during startup. The RAM 512 can also comprise a high-speed RAM such as static RAM for caching data.

The computer 502 further comprises an internal hard disk drive (HDD) 514 (e.g., EIDE, SATA), which internal HDD 514 can also be configured for external use in a suitable chassis (not shown), a magnetic floppy disk drive (FDD) 516, (e.g., to read from or write to a removable diskette 518) and an optical disk drive 520, (e.g., reading a CD-ROM disk 522 or, to read from or write to other high capacity optical media such as the DVD). The HDD 514, magnetic FDD 516 and optical disk drive 520 can be connected to the system bus 508 by a hard disk drive interface 524, a magnetic disk drive interface 526 and an optical drive interface 528, respectively. The hard disk drive interface 524 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 502, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 512, comprising an operating system 530, one or more application programs 532, other program modules 534 and program data 536. All or portions of the operating system, applications, modules, and/or data can also be cached in the RAM 512. The systems and methods described herein can be implemented utilizing various commercially available operating systems or combinations of operating systems.

A user can enter commands and information into the computer 502 through one or more wired/wireless input devices, e.g., a keyboard 538 and a pointing device, such as a mouse 540. Other input devices (not shown) can comprise a microphone, an infrared (IR) remote control, a joystick, a game pad, a stylus pen, touch screen or the like. These and other input devices are often connected to the processing unit 504 through an input device interface 542 that can be coupled to the system bus 508, but can be connected by other interfaces, such as a parallel port, an IEEE 1394 serial port, a game port, a universal serial bus (USB) port, an IR interface, etc.

A monitor 544 or other type of display device can be also connected to the system bus 508 via an interface, such as a video adapter 546. It will also be appreciated that in alternative embodiments, a monitor 544 can also be any display device (e.g., another computer having a display, a smart phone, a tablet computer, etc.) for receiving display information associated with computer 502 via any communication means, including via the Internet and cloud-based networks. In addition to the monitor 544, a computer typically comprises other peripheral output devices (not shown), such as speakers, printers, etc.

The computer 502 can operate in a networked environment using logical connections via wired and/or wireless communications to one or more remote computers, such as a remote computer or computers 548. The remote computer or computers 548 can be a workstation, a server computer, a router, a personal computer, portable computer, microprocessor-based entertainment appliance, a peer device or other common network node, and typically comprises many or all of the elements described relative to the computer 502, although, for purposes of brevity, only a remote memory/storage device 550 is illustrated. The logical connections depicted comprise wired/wireless connectivity to a local area network (LAN) 552 and/or larger networks, e.g., a wide area network (WAN) 554. Such LAN and WAN networking environments are commonplace in offices and companies, and facilitate enterprise-wide computer networks, such as intranets, all of which can connect to a global communications network, e.g., the Internet.

When used in a LAN networking environment, the computer 502 can be connected to the LAN 552 through a wired and/or wireless communication network interface or adapter 556. The adapter 556 can facilitate wired or wireless communication to the LAN 552, which can also comprise a wireless AP disposed thereon for communicating with the adapter 556.

When used in a WAN networking environment, the computer 502 can comprise a modem 558 or can be connected to a communications server on the WAN 554 or has other means for establishing communications over the WAN 554, such as by way of the Internet. The modem 558, which can be internal or external and a wired or wireless device, can be connected to the system bus 508 via the input device interface 542. In a networked environment, program modules depicted relative to the computer 502 or portions thereof, can be stored in the remote memory/storage device 550. It will be appreciated that the network connections shown are example and other means of establishing a communications link between the computers can be used.

The computer 502 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10 BaseT wired Ethernet networks used in many offices.

Figure 6:
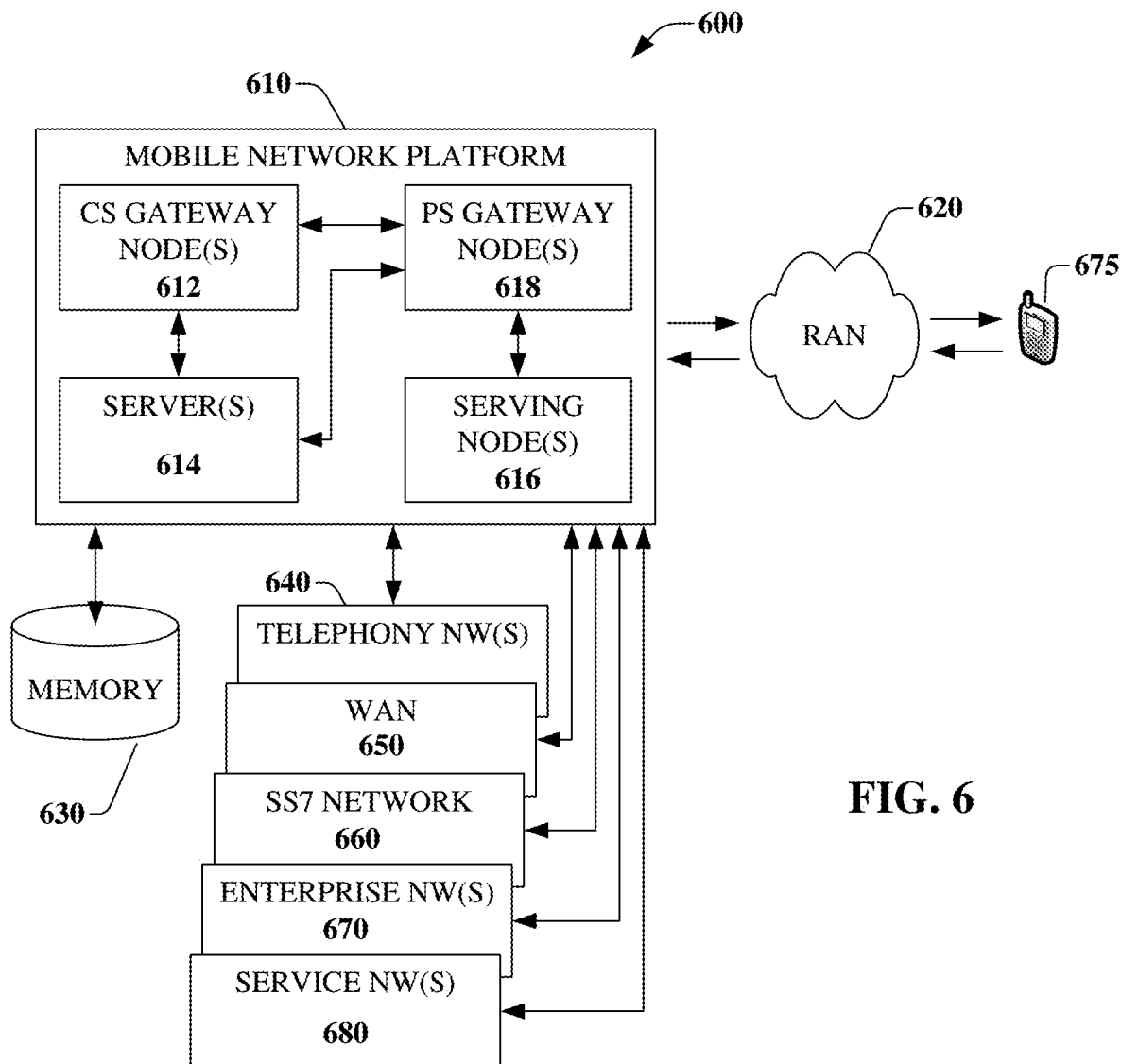
FIG. 6 is a block diagram of an example, non-limiting embodiment of a mobile network platform in accordance with various aspects described herein.

Turning now to FIG. 6, an embodiment 600 of a mobile network platform 610 is shown that is an example of network elements 150, 152, 154, 156, and/or VNEs 430, 432, 434, etc. For example, mobile network platform 610 can facilitate in whole or in part a multi-buyer, multi-seller media content marketplace which receives data from media publishing systems and a target description from a media procurement system, identifies procurable media content slots corresponding to the target description and generates estimate viewership size for the procurable media content slots. The mobile network platform 610 can operate in conjunction with a TV advertising marketplace among buyers and sellers for placement of media content among a plurality of media publishing systems including broadcast, cable, addressable, data driven liner and connected TV systems, among others.

In one or more embodiments, the mobile network platform 610 can generate and receive signals transmitted and received by base stations or access points such as base station or access point 122. Generally, mobile network platform 610 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 610 can be included in telecommunications carrier networks and can be considered carrier-side components as discussed elsewhere herein. Mobile network platform 610 comprises CS gateway node or nodes 612 which can interface CS traffic received from legacy networks like telephony network or networks 640 (e.g., public switched telephone network (PSTN), or public land mobile network (PLMN)) or a signaling system #7 (SS7) network 660. CS gateway node or nodes 612 can authorize and authenticate traffic (e.g., voice) arising from such networks. Additionally, CS gateway node or nodes 612 can access mobility, or roaming, data generated through SS7 network 660; for instance, mobility data stored in a visited location register (VLR), which can reside in memory 630. Moreover, CS gateway node or nodes 612 interfaces CS-based traffic and signaling and PS gateway node or nodes 618. As an example, in a 3GPP UMTS network, CS gateway node or nodes 612 can be realized at least in part in gateway GPRS support node or nodes (GGSN). It should be appreciated that functionality and specific operation of CS gateway node or nodes 612, PS gateway node or nodes 618, and serving node or nodes 616, is provided and dictated by radio technology or technologies utilized by mobile network platform 610 for telecommunication over a radio access network 620 with other devices, such as a radiotelephone 675.

In addition to receiving and processing CS-switched traffic and signaling, PS gateway node or nodes 618 can authorize and authenticate PS-based data sessions with served mobile devices. Data sessions can comprise traffic, or content, exchanged with networks external to the mobile network platform 610, like wide area networks (WANs) 650, enterprise network(s) 670, and service network or networks 680, which can be embodied in local area network or networks (LANs), can also be interfaced with mobile network platform 610 through PS gateway node or nodes 618. It is to be noted that WANs 650 and enterprise network or networks 670 can embody, at least in part, a service network or networks like IP multimedia subsystem (IMS). Based on radio technology layer or layers available in technology resources or radio access network 620, PS gateway node or nodes 618 can generate packet data protocol contexts when a data session is established; other data structures that facilitate routing of packetized data also can be generated. To that end, in an aspect, PS gateway node or nodes 618 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 600, mobile network platform 610 also comprises serving node or nodes 616 that, based upon available radio technology layer or layers within technology resources in the radio access network 620, convey the various packetized flows of data streams received through PS gateway node or nodes 618. It is to be noted that for technology resource(s) that rely primarily on CS communication, server node or nodes can deliver traffic without reliance on PS gateway node 618; for example, server node(s) can embody at least in part a mobile switching center. As an example, in a 3GPP UMTS network, serving node 616 can be embodied in serving GPRS support node or nodes (SGSN).

For radio technologies that exploit packetized communication, server or servers 614 in mobile network platform 610 can execute numerous applications that can generate multiple disparate packetized data streams or flows, and manage (e.g., schedule, queue, format . . . ) such flows. Such application or applications can comprise add-on features to standard services (for example, provisioning, billing, customer support . . . ) provided by mobile network platform 610. Data streams (e.g., contents that are part of a voice call or data session) can be conveyed to PS gateway node or nodes 618 for authorization/authentication and initiation of a data session, and to serving node or nodes 616 for communication thereafter. In addition to application server, server or servers 614 can comprise utility servers, a utility server can comprise a provisioning server, an operations and maintenance server, a security server that can implement at least in part a certificate authority and firewalls as well as other security mechanisms, and the like. In an aspect, security servers secure communication served through mobile network platform 610 to ensure network's operation and data integrity in addition to authorization and authentication procedures that CS gateway node or nodes 612 and PS gateway node or nodes 618 can enact. Moreover, provisioning server(s) can provision services from external network(s) like networks operated by a disparate service provider; for instance, WAN 650 or Global Positioning System (GPS) network (not shown). Provisioning servers can also provision coverage through networks associated to mobile network platform 610 (e.g., deployed and operated by the same service provider), such as the distributed antennas networks shown in FIG. 1 that enhance wireless service coverage by providing more network coverage.

It is to be noted that server 614 can comprise one or more processors configured to confer at least in part the functionality of mobile network platform 610. To that end, the one or more processor can execute code instructions stored in memory 630, for example. It should be appreciated that servers 614 can comprise a content manager, which operates in substantially the same manner as described hereinbefore.

In example embodiment 600, memory 630 can store information related to operation of mobile network platform 610. Other operational information can comprise provisioning information of mobile devices served through mobile network platform 610, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 630 can also store information from at least one of telephony network or networks 640, WAN 650, SS7 network 660, or enterprise network 670. In an aspect, memory 630 can be, for example, accessed as part of a data store component or as a remotely connected memory store.

In order to provide a context for the various aspects of the disclosed subject matter, FIG. 6, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 7:
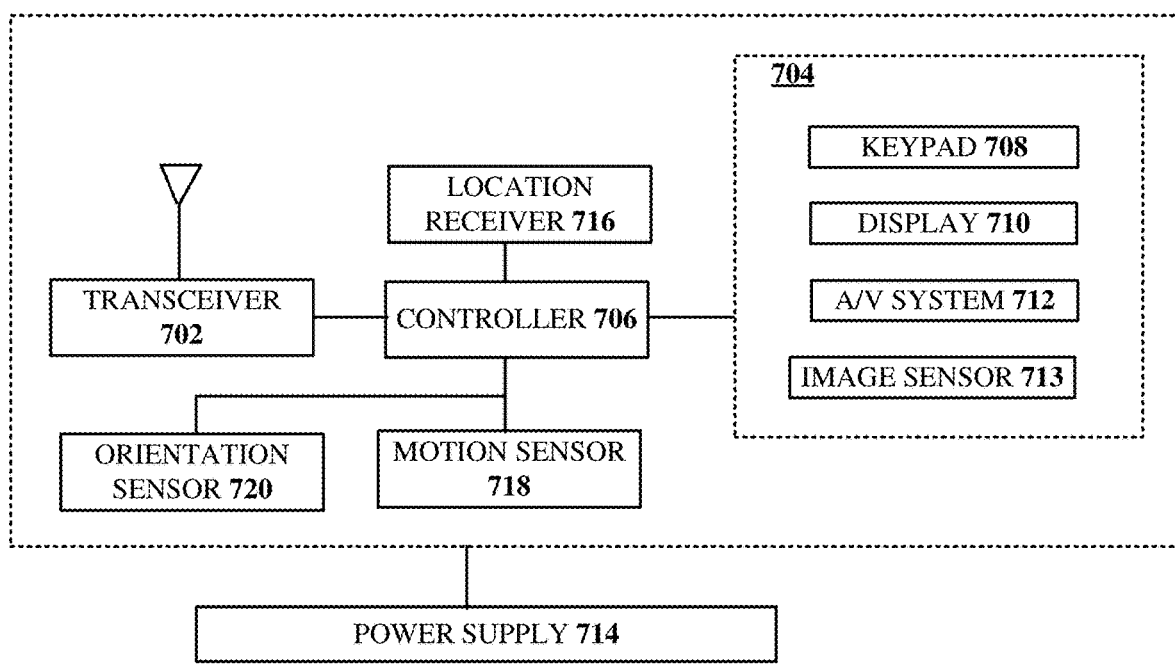
FIG. 7 is a block diagram of an example, non-limiting embodiment of a communication device in accordance with various aspects described herein.

Turning now to FIG. 7, an illustrative embodiment of a communication device 700 is shown. The communication device 700 can serve as an illustrative embodiment of devices such as data terminals 114, mobile devices 124, vehicle 126, display devices 144 or other client devices for communication via either communications network 125. For example, communication device 700 can facilitate in whole or in part a multi-buyer, multi-seller media content marketplace which receives data from media publishing systems and a target description from a media procurement system, identifies procurable media content slots corresponding to the target description and generates estimate viewership size for the procurable media content slots. The communication device 600 can operate in conjunction with a TV advertising marketplace among buyers and sellers for placement of media content among a plurality of media publishing systems including broadcast, cable, addressable, data driven liner and connected TV systems, among others.

The communication device 700 can comprise a wireline and/or wireless transceiver 702 (herein transceiver 702), a user interface (UI) 704, a power supply 714, a location receiver 716, a motion sensor 718, an orientation sensor 720, and a controller 706 for managing operations thereof. The transceiver 702 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 702 can also be adapted to support circuit-switched wireline access technologies (such as PSTN), packet-switched wireline access technologies (such as TCP/IP, VoIP, etc.), and combinations thereof.

The UI 704 can include a depressible or touch-sensitive keypad 708 with a navigation mechanism such as a roller ball, a joystick, a mouse, or a navigation disk for manipulating operations of the communication device 700. The keypad 708 can be an integral part of a housing assembly of the communication device 700 or an independent device operably coupled thereto by a tethered wireline interface (such as a USB cable) or a wireless interface supporting for example Bluetooth®. The keypad 708 can represent a numeric keypad commonly used by phones, and/or a QWERTY keypad with alphanumeric keys. The UI 704 can further include a display 710 such as monochrome or color LCD (Liquid Crystal Display), OLED (Organic Light Emitting Diode) or other suitable display technology for conveying images to an end user of the communication device 700. In an embodiment where the display 710 is touch-sensitive, a portion or all of the keypad 708 can be presented by way of the display 710 with navigation features.

The display 710 can use touch screen technology to also serve as a user interface for detecting user input. As a touch screen display, the communication device 700 can be adapted to present a user interface having graphical user interface (GUI) elements that can be selected by a user with a touch of a finger. The display 710 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 710 can be an integral part of the housing assembly of the communication device 700 or an independent device communicatively coupled thereto by a tethered wireline interface (such as a cable) or a wireless interface.

The UI 704 can also include an audio system 712 that utilizes audio technology for conveying low volume audio (such as audio heard in proximity of a human ear) and high volume audio (such as speakerphone for hands free operation). The audio system 712 can further include a microphone for receiving audible signals of an end user. The audio system 712 can also be used for voice recognition applications. The UI 704 can further include an image sensor 713 such as a charged coupled device (CCD) camera for capturing still or moving images.

The power supply 714 can utilize common power management technologies such as replaceable and rechargeable batteries, supply regulation technologies, and/or charging system technologies for supplying energy to the components of the communication device 700 to facilitate long-range or short-range portable communications. Alternatively, or in combination, the charging system can utilize external power sources such as DC power supplied over a physical interface such as a USB port or other suitable tethering technologies.

The location receiver 716 can utilize location technology such as a global positioning system (GPS) receiver capable of assisted GPS for identifying a location of the communication device 700 based on signals generated by a constellation of GPS satellites, which can be used for facilitating location services such as navigation. The motion sensor 718 can utilize motion sensing technology such as an accelerometer, a gyroscope, or other suitable motion sensing technology to detect motion of the communication device 700 in three-dimensional space. The orientation sensor 720 can utilize orientation sensing technology such as a magnetometer to detect the orientation of the communication device 700 (north, south, west, and east, as well as combined orientations in degrees, minutes, or other suitable orientation metrics).

The communication device 700 can use the transceiver 702 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 706 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 700.

Other components not shown in FIG. 7 can be used in one or more embodiments of the subject disclosure. For instance, the communication device 700 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, x=(x1, x2, x3, x4, . . . , xn), to a confidence that the input belongs to a class, that is, f(x)=confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A method, comprising:

receiving, by a processing system including a processor, first data from each media publishing system of a plurality of media publishing systems operated by different entities, the plurality of media publishing systems facilitating a presentation of media content with one or more procurable media content slots, and the first data from each media publishing system of the plurality of media publishing systems having incompatible data structures;

mapping, by the processing system, the first data from each media publishing system of the plurality of media publishing systems to second data, the second data having a common data structure;

receiving, by the processing system, a first target description from a first media procurement system, the first target description including information to procure media content slots provided by one or more of the plurality of media publishing systems;

comparing, by the processing system, the first target description to the second data in the common data structure;

identifying from the comparing, by the processing system, at least one procurable media content slot provided by one or more media publishing systems of the plurality of media publishing systems that correlates to the first target description;

receiving, by the processing system, first viewership data associated with a viewership of media content presentations that include the at least one procurable media content slot;

generating, by the processing system, according to the first viewership data an estimated viewership size associated with the viewership of media content presentations that include the at least one procurable media content slot;

providing, by the processing system, the estimated viewership size to the first media procurement system, wherein the providing of the estimated viewership size comprises receiving data about viewer characteristics of first viewers of a first media content presented at a first media device, and wherein the receiving of the data about viewer characteristics of the first viewers of the first media content presented at the first media device comprises: receiving addressable viewership information of a plurality of media presentation systems associated with viewer premises, receiving connected viewership information of a plurality of media devices, each respective media device of the plurality of media devices being associated with an internet protocol address for delivery of media content, and receiving linear viewership information based on viewership by a panel of viewers;

mapping the addressable viewership information to the common data structure;

mapping the connected viewership information to the common data structure; and mapping the linear viewership information to the common data structure.

2. The method of claim 1, wherein the identifying the at least one procurable media content slot comprises:

identifying an allocation of a plurality of procurable media content slots to a second media procurement system based on a second target description that overlaps with the first target description; and determining that at least a portion of the allocation of the plurality of procurable media content slots is displaceable to at least one unallocated procurable media content slot that conforms to the second target description.

3. The method of claim 2, further comprising:

displacing the at least the portion of the allocation of the plurality of procurable media content slots to the at least one unallocated procurable media content slot, thereby facilitating availability of the at least one procurable media content slot for use by the first media procurement system.

4. The method of claim 2, wherein the at least one procurable media content slot is supplied by a first media publishing system of the plurality of media publishing systems according to a first media content distribution scheme, wherein the at least one unallocated procurable media content slot is supplied by a second media publishing system of the plurality of media publishing systems according to a second media content distribution scheme, and wherein the first media content distribution scheme differs from the second media content distribution scheme.

5. The method of claim 1, further comprising:

receiving, by the processing system, from the first media procurement system a selection of at least a portion of the at least one procurable media content slot; and receiving, by the processing system, from the first media procurement system, targeted media content for presentation in the at least the portion of the at least one procurable media content slot.

6. The method of claim 5, further comprising delivering, by the processing system, the targeted media content to a portion of the plurality of media publishing systems providing the at least the portion of the at least one procurable media content slot for presentation.

7. The method of claim 6, further comprising receiving, by the processing system, second viewership data associated with a presentation of the targeted media content.

8. The method of claim 7, wherein the second viewership data is provided by a verification system that tracks viewership of the targeted media content when presented in the at least the portion of the at least one procurable media content slot.

9. The method of claim 5, wherein the first viewership data is provided by a monitoring system that tracks consumption of targeted media content presented in the at least one procurable media content slot by each media publishing system of the plurality of media publishing systems.

10. The method of claim 5, wherein the at least one procurable media content slot results in an increase in utilization of previously unused procurable media slots provided by the plurality of media publishing systems.

11. The method of claim 10, wherein the increase in utilization of previously unused procurable media slots increases a volume of distribution of the targeted media content by the first media procurement system.

12. The method of claim 5, further comprising instructing the portion of the plurality of media publishing systems to limit presentation of the target media content according to a threshold capacity.

13. The method of claim 5, further comprising instructing the portion of the plurality of media publishing systems to avoid presentation of other target media content that is related to the target media content in temporal proximity to each other.

14. The method of claim 1, wherein the plurality of media publishing systems comprises systems that deliver media content to addressable television devices, data-driven linear television devices, connected television devices, webserver systems, streaming media systems, or any combinations thereof, and wherein the method further comprises:

receiving, by the processing system, verification data from the one or more of the plurality of media publishing systems, the verification data facilitating verification of a viewing of media content presented via the at least one procurable media content slot by a user; and obtaining, by the processing system, attribution data, the attribution data facilitating detection of an action attributable to the user based on the action correlating to the viewing of the media content via the at least one procurable media content slot by the user.

15. The method of claim 14, wherein the connected television devices are identified with synthetic identifiers.

16. The method of claim 15, wherein the synthetic identifiers comprise a persistent identifier or device-cross graph.

17. The method of claim 16, wherein the persistent identifier comprises an internet protocol address combined with other identifiers of the connected television devices.

18. A device, comprising:
a processing system including a processor; and
a memory that stores executable instructions that, when executed by the processing system, facilitate performance of operations, the operations comprising:
presenting to a media procurement equipment of media distribution services an interface to communicate information about a request for proposal (RFP) for a media distribution arrangement;
receiving, by the interface from the media procurement equipment of media distribution services, first information defining a target description for the media distribution arrangement;
estimating a viewership size responsive to the first information defining the target description, wherein the estimating comprises:
receiving media delivery information for media displayed on a plurality of incompatible media networks,
normalizing the media delivery information to a common media display format, and
estimating the viewership size based on viewership data having the common media display format;
providing to the media procurement equipment of media distribution services an estimated viewership size, where the estimated viewership size includes potential viewers of media content to be communicated to viewer equipment over a plurality of media networks, wherein the providing of the estimated viewership size comprises receiving first data about viewer characteristics of first viewers of a first media content presented at a first media device, and wherein the receiving of the first data about viewer characteristics of the first viewers of the first media content presented at the first media device comprises: receiving addressable viewership information of a plurality of media presentation systems associated with viewer premises, receiving connected viewership information of a plurality of media devices, each respective media device of the plurality of media devices being associated with an internet protocol address for delivery of media content, and receiving linear viewership information based on viewership by a panel of viewers;
receiving, by the interface from the media procurement equipment of media distribution services, a request for procuring media content slots to present media content to viewing equipment based on the estimated viewership size;
providing, to a publishing media system of media distribution services, an interface to communicate second information associated with the request;
receiving from the publishing media system of media distribution services an acceptance of the request;
distributing media content to at least some media networks of the plurality of media networks responsive to the acceptance of the request;
mapping the addressable viewership information to the common media display format;
mapping the connected viewership information to the common media display format; and
mapping the linear viewership information to the common media display format.

19. The device of claim 18, wherein the providing of the estimated viewership size further comprises:
receiving second data about viewer characteristics of second viewers of the first media content presented at a second media device;
identifying one or more viewer segments, each segment having common characteristics, each segment including a plurality of the first viewers and the second viewers; and
providing to the media procurement equipment of media distribution services the estimated viewership size according to segments of the one or more viewer segments which match the target description.

20. The device of claim 18, wherein the operations further comprise:
combining the addressable viewership information, the connected viewership information and the linear viewership information to a canonical targeting lexicon according to the first information defining the target description provided by the media procurement equipment.

21. A method, comprising:
receiving, by a processing system including a processor, a target description from a media procurement system, the target description including information to procure media content slots provided by one or more media publishing systems of a plurality of media publishing systems;
comparing, by the processing system, the target description to delivery data for delivery of media items to media equipment of users;
identifying from the comparing, by the processing system, at least one procurable media content slot provided by one or more media publishing systems of the plurality of media publishing systems that correlates to the target description;
receiving, by the processing system, first viewership data associated with a viewership of media content presentations that include the at least one procurable media content slot;
generating, by the processing system, according to the first viewership data an estimated viewership size associated with the viewership of media content presentations that include the at least one procurable media content slot;
providing, by the processing system, the estimated viewership size to the media procurement system, wherein the providing of the estimated viewership size comprises receiving data about viewer characteristics of first viewers of a first media content presented at a first media device, and wherein the receiving of the data about viewer characteristics of the first viewers of the first media content presented at the first media device comprises: receiving addressable viewership information of a plurality of media presentation systems associated with viewer premises, receiving connected viewership information of a plurality of media devices, each respective media device of the plurality of media devices being associated with an internet protocol address for delivery of media content, and receiving linear viewership information based on viewership by a panel of viewers;
mapping, by the processing system, the addressable viewership information to a common media display format;
mapping, by the processing system, the connected viewership information to the common media display format; and
mapping, by the processing system, the linear viewership information to the common media display format.

22. The method of claim 21, further comprising:
combining, by the processing system, the addressable viewership information, the connected viewership information and the linear viewership information to a canonical targeting lexicon according to the target description.

23. The method of claim 21, further comprising:
receiving, by the processing system, data about viewer characteristics of second viewers of the first media content presented at a second media device; and
identifying, by the processing system, one or more segments, each segment of the one or more segments having common characteristics, wherein each segment is associated with a least one viewer of the first viewers and at least one viewer of the second viewers,
wherein the providing of the estimated viewership size is in accordance with segments of the one or more segments which match the target description.

\* \* \* \* \*